(12) United States Patent
Baba

(10) Patent No.: US 11,076,123 B2
(45) Date of Patent: Jul. 27, 2021

(54) PHOTOGRAPHING CONTROL DEVICE, PHOTOGRAPHING SYSTEM AND PHOTOGRAPHING CONTROL METHOD

(71) Applicant: RENESAS ELECTRONICS CORPORATION, Tokyo (JP)

(72) Inventor: Takehito Baba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/655,895

(22) Filed: Oct. 17, 2019

(65) Prior Publication Data

US 2020/0186748 A1    Jun. 11, 2020

(30) Foreign Application Priority Data

Dec. 7, 2018    (JP) .............................. JP2018-229813

(51) Int. Cl.
| | |
|---|---|
| H04N 5/225 | (2006.01) |
| H04N 5/91 | (2006.01) |
| H04N 5/232 | (2006.01) |
| H04N 1/00 | (2006.01) |

(52) U.S. Cl.
CPC ........... *H04N 5/91* (2013.01); *H04N 1/00183* (2013.01); *H04N 5/23222* (2013.01)

(58) Field of Classification Search
CPC ........................ H04N 1/00183; H04N 5/23222
See application file for complete search history.

(56) References Cited

U.S. PATENT DOCUMENTS

| | | | | |
|---|---|---|---|---|
| 2004/0174434 | A1* | 9/2004 | Walker | H04N 5/77 348/211.3 |
| 2007/0019094 | A1* | 1/2007 | Silberstein | H04N 5/225 348/333.01 |
| 2007/0195174 | A1* | 8/2007 | Oren | H04N 5/23216 348/222.1 |
| 2008/0117310 | A1* | 5/2008 | Kaneda | H04N 5/232933 348/231.2 |
| 2008/0122944 | A1* | 5/2008 | Zhang | H04N 5/23219 348/222.1 |

(Continued)

FOREIGN PATENT DOCUMENTS

| | | |
|---|---|---|
| JP | 2008-288745 A | 11/2008 |
| JP | 2017-104598 A | 6/2017 |

*Primary Examiner* — Twyler L Haskins
*Assistant Examiner* — Dwight Alex C Tejano
(74) *Attorney, Agent, or Firm* — McDermott Will & Emery LLP

(57) ABSTRACT

A photographing control device capable of storing images to be stored at appropriate timings is provided. The analysis result acquiring unit acquires an analysis result of an image obtained by photographing an object by the photographing device. The status acquisition unit acquires a detection result obtained by detecting the status of the object by the sensor. The index determination unit determines the degree of these indexes for each of a plurality of indexes including those relating to the object based on the image analysis result and the detection result of the state of the object. The evaluation value calculation unit calculates an evaluation value for evaluating the stored value of the image using the degree of the index. When the evaluation value exceeds a predetermined threshold value, the image storage control unit 15 controls so as to store an image.

20 Claims, 21 Drawing Sheets

(56) References Cited

U.S. PATENT DOCUMENTS

| | | | | |
|---|---|---|---|---|
| 2008/0192129 A1* | 8/2008 | Walker | ............... | G11B 27/34 |
| | | | | 348/231.2 |
| 2012/0070102 A1* | 3/2012 | Yokokawa | ......... | H04N 5/23222 |
| | | | | 382/286 |
| 2012/0105662 A1* | 5/2012 | Staudacher | ........ | H04N 5/23222 |
| | | | | 348/222.1 |
| 2012/0236163 A1* | 9/2012 | Teruya | ............... | H04N 5/23245 |
| | | | | 348/207.99 |
| 2013/0201359 A1* | 8/2013 | Wu | ..................... | G06T 7/70 |
| | | | | 348/222.1 |
| 2014/0072221 A1* | 3/2014 | Sakai | ................. | G06T 7/194 |
| | | | | 382/173 |

* cited by examiner

FIG. 5

| IMAGE INDEX | DEGREE | | | | | | | | | | |
|---|---|---|---|---|---|---|---|---|---|---|---|
| | 0 | 1 | 2 | 3 | 4 | 5 | 6 | 7 | 8 | 9 | 10 |
| DIRECTION OF OBJECT | NOT TO FACE TO PHOTOGRAPHING DEVICE | | | | | | | | | | FACE TO PHOTOGRAPHING DEVICE |
| DISTANCE TO OBJECT | DISTANCE INAPPROPRIATE FOR PHOTOGRAPHING | | | | | | | | | DISTANCE APPROPRIATE FOR PHOTOGRAPHING | |
| FACIAL EXPRESSION OF OBJECT (SMILE) | EXPRESSIONLESS | | | | | | | | | | SMILING |
| FACIAL EXPRESSION OF OBJECT (SURPRISE) | EXPRESSIONLESS | | | | | | | | | SURPRISING | |
| DISTANCE BETWEEN OBJECT AND CHARACTERISTIC OBJECT | FAR DISTANCE FROM CHARACTERISTIC OBJECT | | | | | | | | NEAR DISTANCE FROM CHARACTERISTIC OBJECT | | |

FIG. 6

| OBJECT STATUS INDEX | DEGREE | | | | | | | | | | |
|---|---|---|---|---|---|---|---|---|---|---|---|
| | 0 | 1 | 2 | 3 | 4 | 5 | 6 | 7 | 8 | 9 | 10 |
| PULSE | LOWER THAN MEAN FOR LAST 1 MINUTE | | | | | | | | HIGHER THAN MEAN FOR LAST 1 MINUTE | | |
| SWEATING | LOW | | | | | | | | | | HIGH |
| ACCELERATION | SMALL MOVEMENT | | | | | | | | | | LARGE MOVEMENT |

FIG. 7

| IMAGE INDEX | DEGREE |
|---|---|
| DIRECTION OF OBJECT | 7 |
| DISTANCE TO OBJECT | 7 |
| FACIAL EXPRESSION OF OBJECT (SMILE) | 7 |
| FACIAL EXPRESSION OF OBJECT (SURPRISE) | 2 |
| DISTANCE BETWEEN OBJECT AND CHARACTERISTIC OBJECT | 10 |
| PULSE | 8 |
| SWEATING | 4 |
| ACCELERATION | 4 |

FIG. 8

| IMAGE INDEX | WEIGHT COEFFICIENT |
|---|---|
| DIRECTION OF OBJECT | 0.8 |
| DISTANCE TO OBJECT | 0.2 |
| FACIAL EXPRESSION OF OBJECT (SMILE) | 0.6 |
| FACIAL EXPRESSION OF OBJECT (SURPRISE) | 0.4 |
| DISTANCE BETWEEN OBJECT AND CHARACTERISTIC OBJECT | 1.0 |
| PULSE | 1.0 |
| SWEATING | 0.6 |
| ACCELERATION | 0.8 |

FIG. 12

| IMAGE INDEX | WEIGHT COEFFICIENT | DEGREE | WEIGHTING POINT |
|---|---|---|---|
| DIRECTION OF OBJECT | 0.8 | 7→7 | 5.6→5.6 |
| DISTANCE TO OBJECT | 0.2 | 2→7 | 0.4→1.4 |
| FACIAL EXPRESSION OF OBJECT (SMILE) | 0.6 | 0→7 | 0→4.2 |
| FACIAL EXPRESSION OF OBJECT (SURPRISE) | 0.4 | 0→2 | 0→0.8 |
| DISTANCE BETWEEN OBJECT AND CHARACTERISTIC OBJECT | 1.0 | 0→10 | 0→10 |
| PULSE | 1.0 | 2→8 | 2→8 |
| SWEATING | 0.6 | 2→4 | 1.2→2.4 |
| ACCELERATION | 0.8 | 2→4 | 1.6→3.2 |
| EVALUATION VALUE Ve | | | 10.8→35.6 |
| THRESHOLD VALUE Th1 | | | 30 |

FIG. 17

| IMAGE INDEX | WEIGHT COEFFICIENT | DEGREE | WEIGHTING POINT |
|---|---|---|---|
| DIRECTION OF OBJECT | 0.8 | 0→8 | 0→6.4 |
| DISTANCE TO OBJECT | 0.2 | 0→7 | 0→1.4 |
| FACIAL EXPRESSION OF OBJECT (SMILE) | 0.6 | 0→7 | 0→4.2 |
| FACIAL EXPRESSION OF OBJECT (SURPRISE) | 0.4 | 0→2 | 0→0.8 |
| DISTANCE BETWEEN OBJECT AND CHARACTERISTIC OBJECT | 1.0 | 0→10 | 0→10 |
| PULSE | 1.0 | 0→10 | 0→10 |
| SWEATING | 0.6 | 1→9 | 0.6→5.4 |
| ACCELERATION | 0.8 | 1→9 | 0.8→7.2 |
| EVALUATION VALUE Ve | | | 1.4→45.4 |
| THRESHOLD VALUE Th1 | | | 30 |

FIG. 21

| IMAGE INDEX | WEIGHT COEFFICIENT | DEGREE | WEIGHTING POINT |
|---|---|---|---|
| DIRECTION OF OBJECT | 0.8 | 2→7 | 1.6→5.6 |
| DISTANCE TO OBJECT | 0.2 | 7 | 1.4 |
| FACIAL EXPRESSION OF OBJECT (SMILE) | 0.6 | 7 | 4.2 |
| FACIAL EXPRESSION OF OBJECT (SURPRISE) | 0.4 | 2 | 0.8 |
| DISTANCE BETWEEN OBJECT AND CHARACTERISTIC OBJECT | 1.0 | 1→10 | 1→10 |
| PULSE | 1.0 | 2→8 | 2→8 |
| SWEATING | 0.6 | 4 | 2.4 |
| ACCELERATION | 0.8 | 4 | 3.2 |
| EVALUATION VALUE Ve | | | 16.6→35.6 |
| THRESHOLD VALUE Th1 | | | 35 |

PHOTOGRAPHING CONTROL DEVICE, PHOTOGRAPHING SYSTEM AND PHOTOGRAPHING CONTROL METHOD

CROSS-REFERENCE TO RELATED APPLICATIONS

The disclosure of Japanese Patent Application No. 2018-229813 filed on Dec. 7, 2018 including the specification, drawings and abstract is incorporated herein by reference in its entirety.

BACKGROUND

The present disclosure relates to a photographing control device, a photographing system, and a photographing control method.

In order to save the storage capacity of devices for storing images when a photographing device such as cameras captures an image of an object, there is a technique for controlling the timings of capturing images. In connection with this technique, Japanese unexamined Patent Application publication No. 2008-288945 (Patent Document 1) discloses a video information processing device. The video information processing device according to Patent Document 1 searches for an object by using radio tags to detect the position of the object when the video camera is started, or the position of the object is lost. In addition, the video information processing device according to Patent Document 1 performs photographing and recording when a face is detected by recognizing an object, and stops photographing and recording if the face is not detected.

Japanese unexamined Patent Application publication No. 2017-104598 (Patent Document 2) discloses a photographing system including a photographing device and a motion state detecting device for detecting a motion state of an object. The motion state detecting device according to Patent Document 2 outputs a photographing control signal for controlling the photographing process in the photographing device according to whether or not the detected detection signal or the like satisfies a predetermined photographing condition. The photographing device starts or ends the photographing process based on the photographing control signal.

SUMMARY

Even in the case of controlling the timing of photographing, when photographing an object, it is desired to photograph and store an image to be stored, that is, an image including a crucial moment of interest. On the other hand, if the timing of photographing and storing an image is not appropriate, such an image to be stored may fail to be stored. Here, in the art according to Patent Document 1, since only the photographing and recording are performed when the face is detected, and the photographing and recording are stopped if the face is not detected, there is a fear that the photographing and recording of an image including a crucial moment of interest cannot be performed. Further, in Patent Document 2, since only the photographing process is started or terminated in accordance with the motion state, there is a possibility that an image including a crucial moment of interest cannot be photographed.

Other objects and novel features will become apparent from the description of this specification and the accompanying drawings.

According to one embodiment, a photographing control device includes an analysis result acquisition unit configured to acquire an analysis result of an image obtained by photographing an object by a photographing device, a status acquisition unit configured to acquire a detection result obtained by detecting a status of the object by a sensor, an index determination unit configured to determine degree of index based on the analysis result of the image and the detection result of the status of the object in each plurality of indexes relating to the object, an evaluation value calculation unit configured to calculate an evaluation value for evaluating a stored value of the image using the degree of indexes, and an image storage control unit configured to control to store the image when the evaluation value exceeds a predetermined first threshold value.

According to one embodiment, a photographing control system includes at least one photographing device photographing at least one object, at least one sensor detecting a status of the at least one object, a photographing control device controlling regarding photographing by the at least one photographing device. The photographing control device includes an analysis result acquisition unit configured to acquire an analysis result of an image obtained by photographing the at least one object by the at least one photographing device, a status acquisition unit configured to acquire a detection result obtained by detecting a status of the at least one object by the at least one sensor, an index determination unit configured to determine degree of index based on the analysis result of the image and the detection result of the status of the at least one object in each plurality of indexes relating to the at least one object, an evaluation value calculation unit configured to calculate an evaluation value for evaluating a stored value of the image using the degree of indexes, and an image storage control unit configured to control to store the image when the evaluation value exceeds a predetermined first threshold value.

According to one embodiment, a photographing control method includes acquiring an analysis result of an image obtained by photographing an object by using a photographing device, acquiring a detection result obtained by detecting a status of the object by using a sensor, determining degree of index based on the analysis result of the image and the detection result of the status of the object in each plurality of indexes relating to the object, calculating an evaluation value for evaluating a stored value of the image using the degree of indexes, and controlling to store the image when the evaluation value exceeds a predetermined first threshold value.

According to the present embodiment, there can be provided a photographing control device, a photographing system, and a photographing control method capable of storing images to be stored at appropriate timings.

BRIEF DESCRIPTION OF THE DRAWINGS

FIG. 5 is an example of an image index table that matches image indexes with degree.

FIG. 6 is a diagram showing an example of the object status index table that matches the degree of the object status index.

FIG. 7 is a diagram showing the degree of image index and the degree of object status index for the object.

FIG. 8 is a diagram that illustrates the weight coefficient table.

FIG. 12 is a diagram showing the change in the evaluation value when moving from the standby mode to the storing mode.

FIG. 17 is an example of the change in the evaluation value associated with the object photographed in the image shown in FIG. 16.

FIG. 21 is a diagram to illustrate that the evaluation increased by improving the effect made by the photographing control device related to third embodiment.

DETAILED DESCRIPTION

Figure 1:
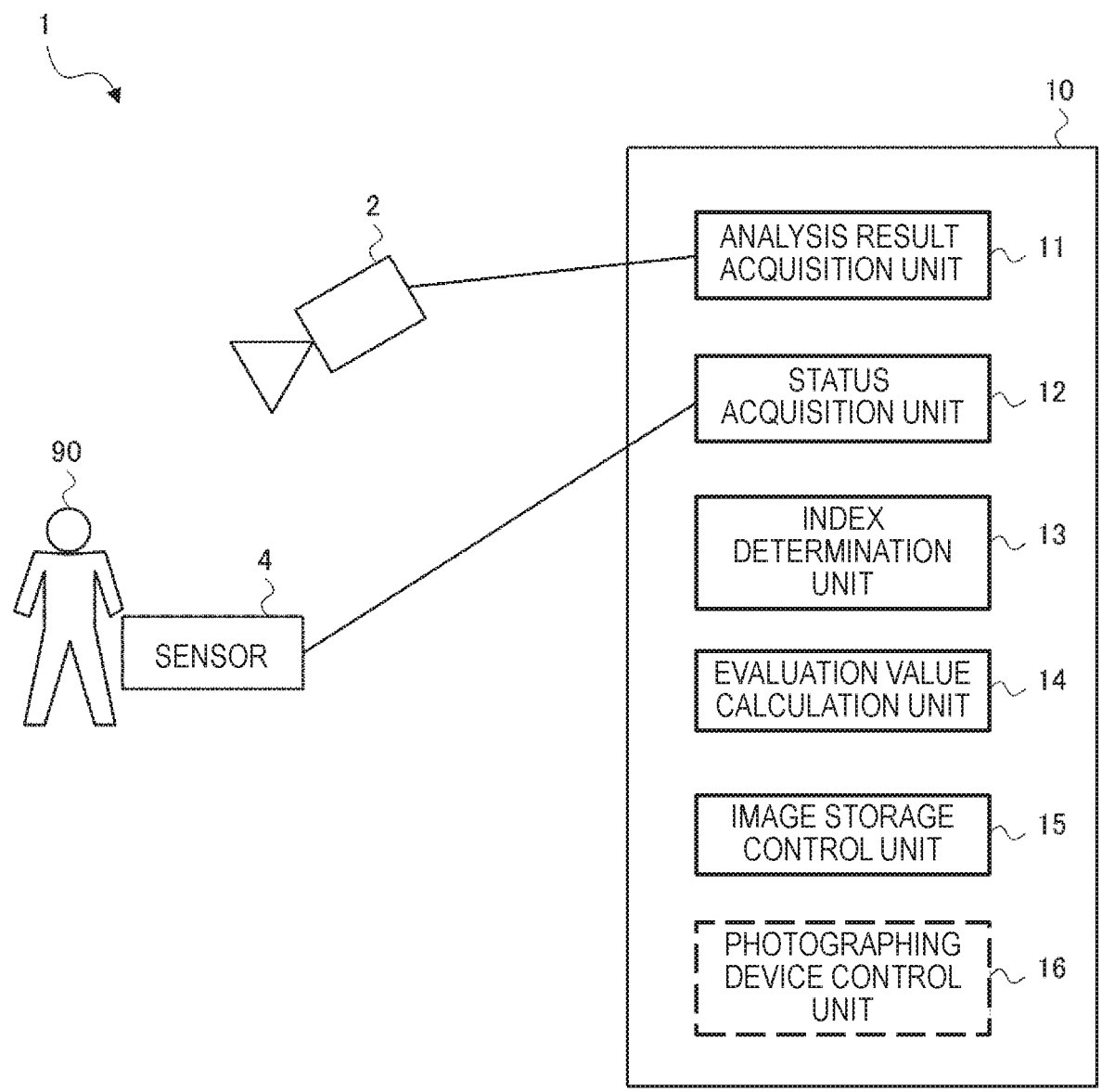
FIG. 1 is a diagram showing an outline of an photographing system according to the present embodiment.

Embodiments will be described below with reference to the drawings. For clarity of explanation, the following description and drawings are appropriately omitted and simplified. In the drawings, the same elements are denoted by the same reference numerals, and a repetitive description thereof is omitted as necessary.

In the following embodiments, when required for convenience, the description will be made by dividing into a plurality of sections or embodiments, but except when specifically stated, they are not independent of each other, and one is related to the modified example, some or all of the other, applications, detailed description, supplementary description, and the like. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

In addition, the elements described in the drawings as functional blocks for performing various processes can be configured as CPU (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them.

Outline of Embodiment

Prior to the explanation of the embodiment, the outline of the present embodiment will be explained. FIG. 1 is a diagram showing an outline of a photographing system 1 according to the present embodiment. The photographing system 1 comprises one or more photographing device 2, one or more sensors 4 and a photographing control device 10. The photographing control device 10 is connected to the photographing device 2 and the sensor 4 via wired or wirelessly.

The photographing device 2 is, for example, camera. The photographing device 2 may be fixedly disposed at a certain position or may be movable. The photographing device 2 may be mounted on an unmanned flying object (drone or the like) that can be operated remotely or automatically and can fly autonomously or may be an action camera. The number of the photographing device 2 is not limited to one and may be plural. The photographing device 2 may be connected to another photographing device 2 via networks.

The photographing device 2 photographs a human object 90 and generates an image. The object 90 may be a participant in a service provided by the photographing system 1. Here, the term "image" may be a still image, a moving image, or both. In the following, the term "image" also means "image data showing an image" as a target of processing in information processing. The photographing device 2 may transmit the acquired image to the photographing control device 10.

The sensor 4 detects the status of the object 90. The sensor 4 may be mounted on or carried by the object 90. The sensor 4 is, for example, but not limited to, a pulse sensor, a sweat sensor, an acceleration sensor, a position sensor, or the like. The sensor 4 may transmit data indicating the detected status of the object 90 to the photographing control device 10.

The photographing control device 10 controls image photographing by the photographing device 2, as will be described later. The photographing control device 10 controls timing at which images generated by the photographing device 2 are stored. The photographing device 2 may control the photographing device 2 so as to track and photograph the object 90.

The photographing control device 10 has a function as a computer having CPU, memories, and radio communication devices. The photographing control device 10 includes a processor such as a central processing unit (CPU), a storage device such as a memory, a radio communication device, and various peripheral circuits. That is, the photographing control device 10 has a function as a computer.

The photographing control device 10 includes an analysis result acquisition unit 11, a status acquisition unit 12, an index determination unit 13, an evaluation value calculation unit 14, and an image storage control unit 15. The photographing control device 10 may include a photographing device control unit 16. Functions of these components will be described later.

In the photographing control device 10, the processor may execute the programs stored in the storage device, thereby realizing components such as the analysis result acquisition unit 11, the status acquisition unit 12, the index determination unit 13, the evaluation value calculation unit 14, the image storage control unit 15, and the photographing device control unit 16. The constituent elements of the photographing control device 10 are not limited to being implemented by software based on programs, and may be implemented by any of hardware, firmware, software, or the like. The components of the photographing control device 10 may also be implemented using user-programmable integrated circuits, such as FPGA (field-programmable gate array) or microcontrollers, for example. In this case, the integrated circuit may be used to implement a program composed of the above-mentioned components. This also applies to other embodiments described later.

Figure 2:
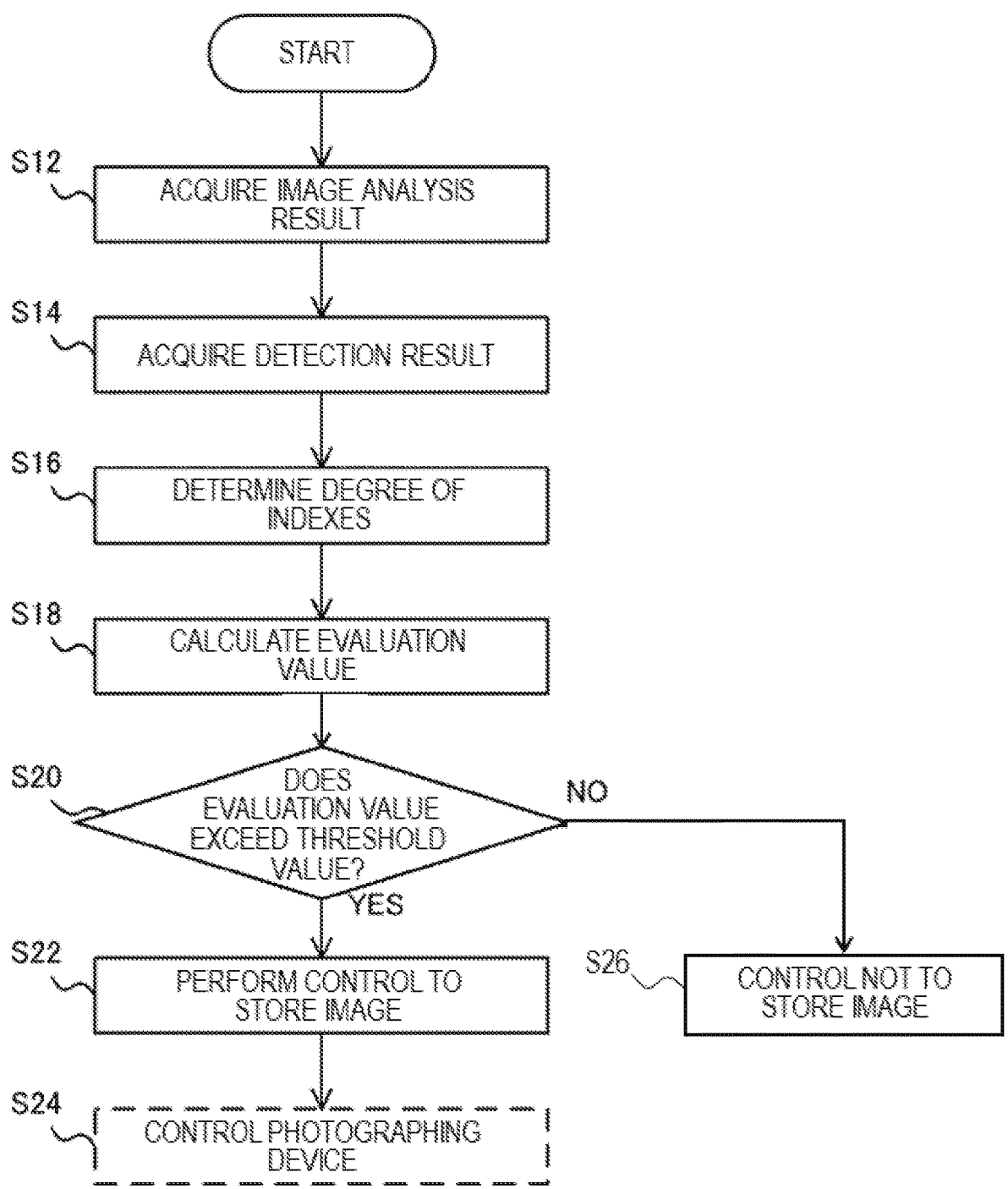
FIG. 2 is a flow chart showing an outline of the photographing control method implemented by the photographing control device for present embodiment.

FIG. 2 is a flow chart showing an outline of a photographing control process executed by the photographing control device 10 according to the present embodiment. The analysis result acquisition unit 11 acquires an analysis result (image analysis result) of an image obtained by photographing an object by the photographing device 2 (step S12). Here, the analysis result acquisition unit 11 may acquire the result of the image analysis performed by another device. Alternatively, the analysis result acquisition unit 11 may perform image analysis.

The image analysis may include, for example, face recognition processing for determining whether or not a face of the object 90 registered in advance exists in the image, direction determination for determining the direction of the object 90, and facial expression determination for determining the facial expression of the object 90. The image analysis may also include position determination to determine the position of the object 90 and distance determination to determine the distance from the photographing device 2 to the object 90 or the distance between the object 90 and other objects. However, the image analysis may include processes other than these processes.

The status acquisition unit 12 acquires a detection result (sensor data) obtained by detecting the status of the object 90 by the sensor 4 (step S14). The status acquisition unit 12 may acquire (receive) the sensor data, which is the detection result, directly from the sensor 4, or may acquire the sensor data through another device. The detection result is, for example, a pulse value, a sweat value, an acceleration, positional information, or the like, but is not limited thereto. It is assumed that the status acquisition unit 12 acquires the status of the object 90 at the same timing as the timing at which the image to be perform the image analysis is photographed. Here, the "same timing" does not have to be exactly the same time. The "same timing" may mean that the image is photographed and the status of the object 90 is detected at a time close to the detection of the status of the object 90 in the image to be perform the image analysis.

In step S16, the index determination unit 13 determines the degree of these indexes for each of a plurality of indexes including those relating to the object 90 based on the image analysis result and the detection result of the status of the object 90. In step S18, the evaluation value calculation unit 14 calculates an evaluation value for evaluating the stored value of the image using the degree of the indexes. Here, the "index" is an element serving as a reference when the evaluation value is judged. The "index" and "evaluation value" will be described later.

The "stored value of an image" indicates whether or not the image captures a crucial moment that attracts human interest. For example, when the facial expression of the object 90 shows a smile or surprise, and the object 90 is in an excited state, the photographed image of the object may be viewed as having photographed a crucial moment to be stored. As described above, since the image capturing the crucial moment tends to be desired to be viewed later by the object 90 or the like, it is an image to be stored.

When the evaluation value exceeds a predetermined threshold value (YES in step S20), the image storage control unit 15 performs control to store an image (step S22). The images may be stored in the photographing control device 10 or may be stored in a storage device external to the photographing control device 10. In addition, in this instance (YES in step S20), the photographing device control unit 16 may control the photographing device 2 to make the object 90 conspicuous (step S24). The photographing device control unit 16 controls the photographing device 2 to perform panning, tilting, zooming, or the like so that, for example, the object 90 is projected relatively large in the vicinity of the center of the image. When the evaluation value does not exceed the threshold value (NO in step S20), control is performed so as not to store the image (step S26).

With such a configuration, the photographing control device 10 according to the present embodiment performs control so as to store images when the status of the object 90 indicates a crucial moment. As a result, it is possible to store an image that captures a crucial moment while suppressing redundancy in the image capturing time (data amount) of the image including the crucial moment. Therefore, the photographing control device 10 can store images to be stored at appropriate timings. Images to be stored can also be stored at appropriate timings by the photographing control methods performed by the photographing system 1 including the photographing control device 10 and the photographing control device 10.

First Embodiment

Figure 3:
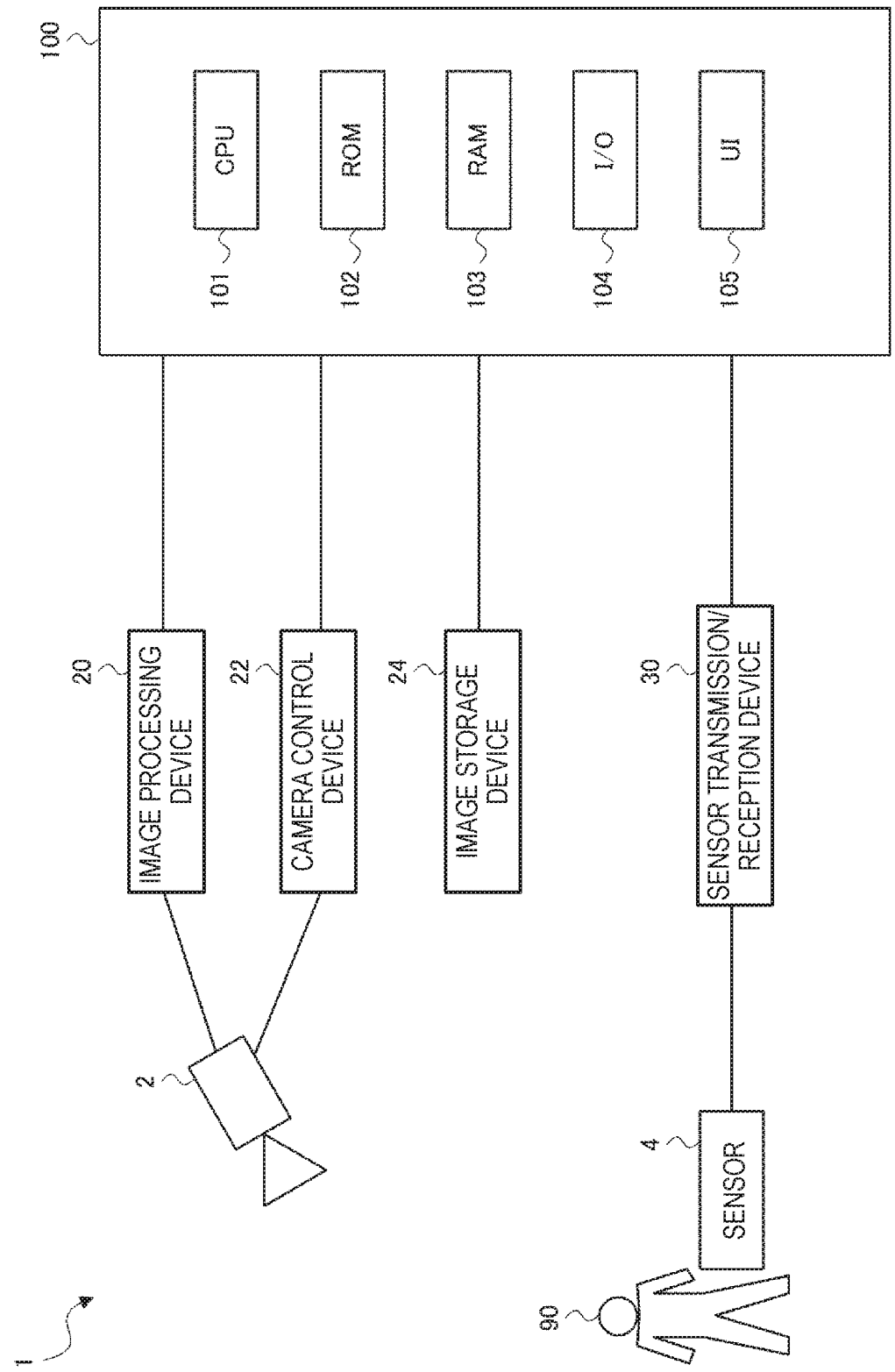
FIG. 3 is a diagram showing the configuration of the photographing system related to first embodiment.

Next, first embodiment will be described. FIG. 3 is a diagram showing a configuration of the photographing system 1 according to the first embodiment. The photographing system 1 includes one or more photographing devices 2, one or more sensors 4, an image processing device 20, a camera control device 22, an image storage device 24, a sensor transmission/reception device 30, and a photographing control device 100. The photographing device 2, the sensor 4, and the photographing control device 100 correspond to the photographing device 2, the sensor 4, and the photographing control device 10 shown in FIG. 1, respectively. In the example of FIG. 3, the object 90 is photographed. At this time, it is assumed that the information of the object 90 (identification information, facial information, height, and the like) is registered in advance in the photographing control device 100. The photographing control device 100 is connected to the image processing device 20, the camera control device 22, the image storage device 24, and the sensor transmission/reception device 30 via wire or wirelessly.

The image processing device 20 analyzes an image acquired by the photographing device 2, and outputs image analysis data, which is an image analysis result, to the photographing control device 100. As described above, the image analysis performed by the image processing device 20 includes face recognition determination, direction determination, facial expression determination, distance determination, and the like. The function of the image processing device 20 may be provided in the photographing control device 100 or in the photographing device 2.

When the face recognition determination is performed, the image processing device 20 extracts a human face from the image. The image processing device 20 calculates the degree of coincidence between the face image of the object 90 registered in advance and the extracted face by pattern matching or the like. Then, the image processing device 20 determines that the face of the object 90 is included in the image when the degree of coincidence is equal to or greater than a predetermined threshold value.

For example, when the direction determination is performed, the image processing device 20 first recognizes the face of the object 90 in the image by the face recognition determination described above. The image processing device 20 detects feature points such as eyes, noses, mouths, ears, and the like of the object 90 in the image, and estimates the direction (angles) θ [degrees] of the object 90 from the positions of the feature points in the image, distances between the feature points, and the like. The image processing device 20 may determine the direction of the object 90 by estimating the direction of the line of sight of the object 90.

For example, when determining the distance from the photographing device 2 to the object 90, the image processing device 20 registers the size of the object 90 in advance. The image processing device 20 extracts the object 90 from the image photographed by the photographing device 2 by pattern matching or the like, and calculates an area (pixel count) occupied by the object 90 in the image. The image processing device 20 estimates the distance D[m] to the object 90 based on the zooming, the angle of view, the number of pixels corresponding to the object 90, the size of the registered object 90, and the like of the photographing device 2.

For example, when facial expression determination is performed, the image processing device 20 first recognizes the face of the object 90 in the image by the face recognition determination. The image processing device 20 may digitize the facial expression of the object 90 (e.g., "pleasure" and "surprise") using artificial intelligence, e.g., "Affdex" or "Emotion API".

The image processing device 20 may also determine distances between the object and the characteristic object. Here, the "characteristic object" is an object that can raise the emotion of the object 90. The "characteristic object" may be, for example, a mascot character such as a cartoon-character costume or robot, or may be a famous building or landscape. The image processing device 20 registers the object 90 and the characteristic object in advance. The image processing device 20 extracts the object 90 and the characteristic object from the image photographed by the photographing device 2 by pattern matching or the like. The image processing device 20 estimates distance from the photographing device 2 to the object 90 in the above-described method. In a similar manner, the image processing device 20 estimates distances from the photographing device 2 to the characteristic object. The image processing device 20 also calculates the number of pixels in the image between the object 90 and the characteristic object. The image processing device 20 estimates the distance C[m] between the object and the characteristic object based on the zooming of the imaging device 2, the angle of view, the number of pixels between the object 90 and the characteristic object, the distance from the photographing device 2 to the object 90, the distance from the photographing device 2 to the characteristic object, and the like.

The camera control device 22 controls the operation of the photographing device 2 in response to an instruction from the photographing control device 100. For example, the camera control device 22 performs panning, tilting, zooming, and the like in response to an instruction from the photographing control device 100. As a result, the photographing device 2 can track the object 90 and photograph to make the object 90 stand out. That is, the phrase "tracking and photographing the object 90" means photographing an image in which the object 90 becomes conspicuous by performing panning, tilting, zooming, and the like. For example, the camera control device 22 may recognize the face of the object 90, and control the photographing device 2 so that the recognized face of the object 90 is displayed in a predetermined area in the vicinity of the center of the image in a predetermined size. The function of the camera control device 22 may be provided in the photographing control device 100 or in the photographing device 2.

The image storage device 24 is a memory such as a ROM (Read Only Memory) or a RAM (Random Access Memory), or a storage device such as a hard disk. The image storage device 24 stores an image photographed by the photographing device 2 in response to an instruction from the photographing control device 100. The Image storage device 24 starts to store the image taken by photographing device 2 when receiving an instruction to start storing the image from the photographing control device 100. The image storage device 24 terminates to store the image photographed by the photographing device 2 when receiving an instruction to terminate to store the image from the photographing control device 100. The function of the image storage device 24 may be provided in the photographing control device 100 or may be provided in the photographing device 2.

The sensor transmission/reception device 30 receives signals transmitted from the sensors 4, and transmits the signals as sensor data to the photographing control device 100. The function of the sensor transmission/reception device 30 may be provided in the photographing control device 100 or in the sensor 4.

The photographing control device 100 has a function as a computer, for example. The photographing control device 100 may be mounted on the photographing device 2. The photographing control device 100 includes a CPU 101, a ROM 102, a RAM 103, an I/O (Input/Output) 104, and a UI (User Interface) 105.

The CPU 101 functions as processing device for performing control processing, arithmetic processing, and the like. The ROM 102 has a function for storing a control program and an arithmetic program executed by the CPU 101. The RAM 103 has a function of temporarily storing process data and the like. The I/O 104 is a communication device, which inputs data and signals from the outside and outputs data and signals to the outside. The UI 105 is composed of an input device, such as a keyboard, and an output device, such as a display, for example. The UI 105 may be configured as a touch panel in which an input device and an output device are integrated.

Figure 4:
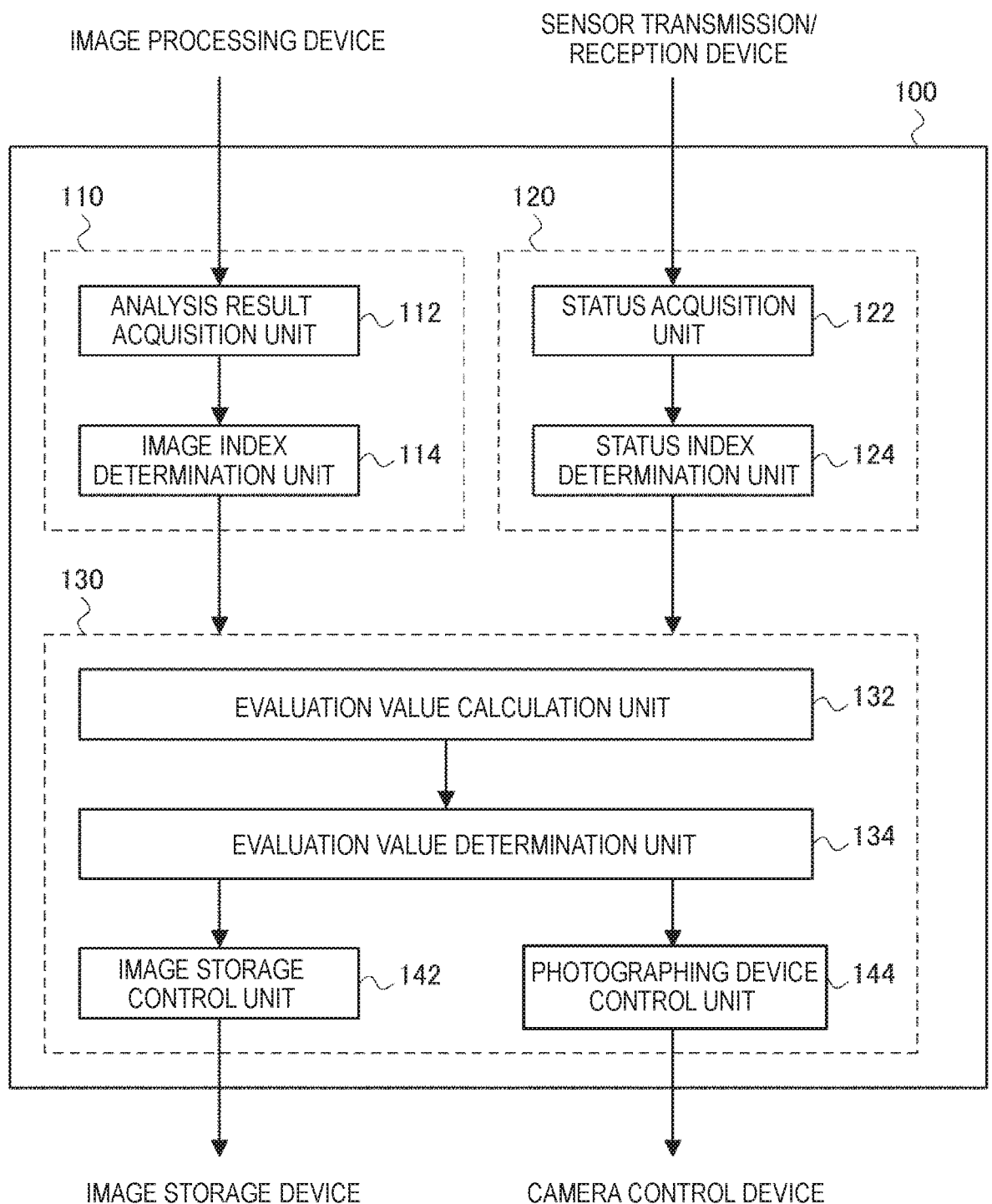
FIG. 4 is a functional diagram showing the configuration of the photographing control device for first embodiment.

FIG. 4 is a functional diagram showing a configuration of the photographing control device 100 according to the first embodiment. The photographing control device 100 includes an analysis result acquisition unit 112, an image index determination unit 114, a status acquisition unit 122, a status index determination unit 124, an evaluation value calculation unit 132, an evaluation value determination unit 134, an image storage control unit 142, and an photographing device control unit 144. The components of the photographing control device 100 shown in FIG. 4 can be realized by the CPU 101 executing programs stored in the ROM 102. The analysis result acquisition unit 112, the status acquisition unit 122, the evaluation value calculation unit 132, the image storage control unit 142, and the photographing device control unit 144 correspond to the analysis result acquisition unit 11, the status acquisition unit 12, the evaluation value calculation unit 14, the image storage control unit 15, and the photographing device control unit 16 shown in FIG. 1, respectively. The image index determination unit 114 and the status index determination unit 124 correspond to the index determination unit 13 shown in FIG. 1.

The components of the photographing control device 100 shown in FIG. 4 may be realized by one or more separate device. For example, the analysis result acquisition unit 112 and the image index determination unit 114 may be implemented by the image data calculation device 110 that performs calculation on image data. The status acquisition unit 122 and the status index determination unit 124 may be realized by the sensor data calculation device 120 that performs computation on the sensor data. Further, the evaluation value calculation unit 132, the evaluation value determination unit 134, the image storage control unit 142, and the photographing device control unit 144 may be realized by the photographing calculation device 130 that performs control related to photographing. The image data calculation device 110, the sensor data calculation device 120, and the photographing calculation device 130 may include a CPU 101, a ROM 102, a RAM 103, a I/O 104, and a UI 105, respectively.

The analysis result acquisition unit 112 acquires image analysis data from the image processing device 20. The analysis result acquisition unit 112 may have the function of the image processing device 20, and the analysis result acquisition unit 112 may perform image analysis. The image index determination unit 114 determines an image index using the image analysis data. Specifically, the image index determination unit 114 determines the degree of a plurality of image indices related to the image analysis result. Here, the "image index" is an element related to an image analysis result, which is a reference when judging whether or not an image should be stored. The image index determination unit 114 determines the degree of these indices for each of a plurality of image indices using the image analysis data. The image index determination unit 114 outputs the degree of the determined image index to the evaluation value calculation unit 132.

FIG. 5 is a diagram exemplifying an image index table in which an image index and a degree are associated with each other. In the example shown in FIG. 5, the image indices may include "orientation of the object", "distance to the object", "facial expression of the object (smile)", "facial expression of the object (surprise)", and "distance between the object and the characteristic object". In addition, 11 levels from "0" to "10" are set for each index.

The image index determination unit 114 determines the degree of the image index "direction of the object" in accordance with the direction $\theta$ of the object 90. For example, when the face of the object 90 does not face to the photographing device 2 at all, the image index determination unit 114 sets the degree of the "direction of the object" to "0". On the other hand, when the face of the object 90 is completely facing to the photographing device 2, the image index determination unit 114 sets the degree of the "direction of the object 90" to "10". For example, it is assumed that the direction $\theta$ of the object 90 when facing to the photographing device 2 is 0 degrees, and a positive angle ($\theta>0$) is defined as a positive angle when the object 90 faces leftward with respect to the imaging device 2. In this case, for example, when the direction $\theta$ of the object 90 is ±100 to 180 degrees, the image index determination unit 114 may set the degree of the "direction of the object" to "0". For example, when the direction $\theta$ of the object 90 is ±0 to 3 degrees, the image index determination unit 114 may set the degree of the "direction of the object" to "10". For example, when the direction $\theta$ of the object 90 is ±3 to 5 degrees, the image index determination unit 114 may set the degree of the "direction of the object 90" to "9". The image index determination unit 114 may determine the degree of the image index "direction of the object" by using a table in which the value of the direction $\theta$ of the object 90 and the degree of the "direction of the object" are associated with each other.

The image index determination unit 114 determines the degree of the image index "distance to the object" in accordance with the distance D between the photographing device 2 and the object 90. For example, it is assumed that D=D0 [m] is suitable for photographing the object 90. That is, it is assumed that the distance of the object 90 suitable for photographing is D0. In this instance, the image index determination unit 114 determines the degree of the image index "distance to the object" so that the degree of the image index "distance to the object" becomes larger as the distance D from the photographing device 2 to the object 90 becomes closer to D0. Therefore, when D=D0, the degree of the image index "distance to the object" may be "10". The greater the difference between D and D0, the smaller the degree of the image index "distance to the object". The image index determination unit 114 may determine the degree of the image index "distance to the object" using a table in which the values of the distance D between the photographing device 2 and the object 90 are associated with the degree of the "distance to the object". Note that D0 may be a predetermined value, or may be a value that can vary according to the height of the object 90.

The image index determination unit 114 determines the degree of the image index "facial expression (smiling face) of the object" in accordance with the numerical value indicating the smiling face of the object 90 calculated by the image processing device 20. Specifically, the image index determination unit 114 determines the degree of the image index "facial expression (smiling face) of the object" such that the degree of the image index "facial expression (smiling face) of the object" increases as the numerical value indicating the smiling face increases. The image index determination unit 114 may determine the degree of the image index "facial expression (smiling face) of the object" by using a table in which the numerical value indicating the smiling face is associated with the degree of "facial expression (smiling face) of the object". Similarly, the image index determination unit 114 determines the degree of the "facial expression (surprise) of the object" according to the numerical value indicating the surprise of the object 90 calculated by the image process device 20.

The image index determination unit 114 determines the degree of the image index "the distance between the object and the characteristic object" in accordance with the distance C between the object 90 and the characteristic object. Specifically, the image index determination unit 114 determines the degree of the image index "distance between the object and the characteristic object" such that the smaller the distance C, that is, the closer the object 90 is to the characteristic object, the greater the degree of the image index "distance between the object and the characteristic object". The image index determination unit 114 may determine the degree of the image index "distance between the object and the characteristic object" by using a table in which the distance C between the object 90 and the characteristic object and the degree of "distance between the object and the characteristic object" are associated with each other.

The status acquisition unit 122 (FIG. 4) acquires sensor data indicating the status of the object 90 from the sensor transmission/reception device 30. The status acquisition unit 122 may acquire the sensor data directly from the sensor 4. It is also assumed that the status acquisition unit 122 acquires the status of the object 90 at the timing when the image to be analyzed is captured. That is, it is assumed that the timing at which the image analyzed to obtain the image analysis data acquired by the analysis result acquisition unit 112 is photographed is substantially the same as the timing at which the status of the object 90 is detected by the sensor 4 to obtain the sensor data acquired by the status acquisition unit 122.

The status index determination unit 124 determines the object status index using the sensor data. Specifically, the degree of the plurality of object status indices related to the sensor data is determined. Here, the "object status index" is an element related to sensor data that is used as a reference when determining whether or not an image should be stored. The status index determination unit 124 determines the degree of these indices for each of a plurality of object status indices using the sensor data. The status index determination unit 124 outputs the degree of the determined object status index to the evaluation value calculation unit 132.

FIG. 6 is a diagram exemplifying an object status index table in which an object status index and a degree are associated with each other. In the example shown in FIG. 6, the object status indicator may include "pulse", "sweating" and "acceleration". In addition, 11 levels from "0" to "10" are set for each index.

The status index determination unit 124 determines the degree of the object status index "pulse" in accordance with the pulse of the object 90 detected by the sensor 4 which is the pulse sensor. The status index determination unit 124 compares the pulse rate P of the object 90 with the mean Pave of the pulse rate for the last 1 minute. Then, the status index determination unit 124 determines the degree of the object status index "pulse" so that the degree of the object status index "pulse" increases as the difference ΔP (=P− Pave) between the pulse rate P and the mean Pave increases. Here, when ΔP=0, the degree of the object status index "pulse" may be "5". Then, when ΔP<0, the degree of the object status index "pulse" may be "0" to "4", and when ΔP>0, the degree of the object status index "pulse" may be "6" to "10". The status index determination unit 124 may determine the degree of the object status index "pulse" using a table in which the difference ΔP and the degree of the object status index "pulse" are associated with each other.

The status index determination unit 124 determines the degree of the object status index "sweating" in accordance with the sweating amount of the object 90 detected by the sensor 4 which is the sweating sensor. More specifically, the status index determination unit 124 determines the degree of the object status index "sweating" such that the degree of the object status index "sweating" increases as the amount of sweating of the object 90 increases. The status index determining unit 124 may determine the degree of the object status index "sweating" by using a table in which the amount of sweating and the degree of the object status index "sweating" are associated with each other.

The status index determination unit 124 determines the degree of the object status index "acceleration" in accordance with the acceleration of the object 90 detected by the sensor 4 which is the acceleration sensor. Specifically, the status index determination unit 124 determines the degree of the object status index "acceleration" so that the degree of the object status index "acceleration" becomes larger as the acceleration of the object 90 is larger, that is, the operation (walking movement, up/down/left/right movement, etc.) of the object 90 is larger. The status index determination unit 124 may determine the degree of the object status index "acceleration" using a table in which the acceleration and the degree of the object status index "acceleration" are associated with each other.

FIG. 7 is a diagram exemplifying the degree of the image index and the degree of the object status index with respect to the object 90. In the example shown in FIG. 7, the image index determination unit 114 determines the degrees of the image indices "direction of the object", "distance to the object", "facial expression of the object (smile)", "facial expression of the object (surprise)", and "distance between the object and the characteristic object" as "7", "7", "7", "2", and "10", respectively. In the example shown in FIG. 7, the status index determination unit 124 determines that the object status indices "pulse", "sweating", and "acceleration" are "8", "4", and "4", respectively. The image index and the object status index are sometimes collectively referred to as "indices".

The evaluation value calculation unit 132 (FIG. 4) calculates an evaluation value for evaluating the stored value of the image using the degrees of the image index and the object status index. Specifically, the evaluation value calculation unit 132 calculates the sum of the product of the degree of each index and the weight coefficient set in advance for each index as an evaluation value. The evaluation value calculation unit 132 outputs the calculated evaluation value to the evaluation value determination unit 134. It is assumed that the degree of the index used in the calculation of the evaluation value performed by the evaluation value calculation unit 132 is acquired by using the image photographed at the same timing and the status of the detected object 90. The evaluation value calculation unit 132 may calculate the evaluation value by using a weight coefficient table as exemplified in FIG. 8.

FIG. 8 is a diagram exemplifying a weight coefficient table. In the example shown in FIG. 8, the weight coefficients of the image indices "direction of the object", "distance to the object", "facial expression of the object (smile)", "facial expression of the object (surprise)" and "distance between the object and the characteristic object" are "0.8", "0.2", "0.6", "0.4" and "1.0", respectively. The weight coefficients of the object status indices "pulse," "sweating," and "acceleration" are "1.0," "0.6," and "0.8," respectively. Here, the weight coefficient of each index may be appropriately set in accordance with the degree of importance (contribution) of each index to the evaluation of the stored value of the image. Therefore, an index having a high weight coefficient is an important index for evaluating the storage value of an image. In the example of FIG. 8, the "distance between the object and the characteristic object" and the "pulse" having the weight coefficient of "1.0" are high in importance, and the "distance to the object" having the weight coefficient of "0.2" is low in importance.

The evaluation value calculation unit 132 calculates, as an evaluation value, the sum of the values obtained by multiplying the degree of each index by the weight coefficient corresponding to the index. That is, when the evaluation value is Ve, the degree of the index k (k=1 to N) is $L_k$, and the weight coefficient of the index k is $c_k$, the evaluation value is Ve=$\Sigma_{k=1}^{N}(L_k*c_k)$. In the example of FIGS. 7 and 8, Ve=7*0.8+7*0.2+7*0.6+2*0.4+10*1.0+8*1.0+4*0.6+4*0.8=35.6. The product of the degree $L_k$ and the weight coefficient $c_k$ may be referred to as weighting points.

The evaluation value determination unit 134 compares the evaluation value calculated by the evaluation value calculation unit 132 with a predetermined threshold value to determine whether or not the evaluation value exceeds the threshold value. Then, the evaluation value determination unit 134 outputs the determination result to the image storage control unit 142 and the photographing device control unit 144. That is, the evaluation value determination unit 134 determines whether or not the image corresponding to the index used when the evaluation value is calculated is an image to be evaluated, and whether or not it is worth storing the image to be evaluated which is the image corresponding to the index used when the evaluation value is calculated. When the evaluation value is larger than the threshold value, the evaluation value determination unit 134 determines that the image to be evaluated is worth storing. On the other hand, when the evaluation value is equal to or less than the threshold value, the evaluation value determination unit 134 determines that the image to be evaluated is not worth storing.

When the evaluation value exceeds the threshold value, the image storage control unit 142 performs control so as to store the image to be evaluated. Specifically, the image storage control unit 142 controls the image storage device 24 to store the image to be evaluated. At this time, the image storage control unit 142 may transmit the image to be evaluated to the image storage device 24. Alternatively, the image storage control unit 142 may control the image storage device 24 to acquire and store an image to be evaluated from the photographing device 2. On the other hand, when the evaluation value is equal to or less than the threshold value, the image storage control unit 142 performs control so as not to store the image to be evaluated.

The photographing device control unit 144 controls the photographing device 2 so that an image in which the object 90 is conspicuous can be photographed by tracking the object 90 when the evaluated value exceeds the threshold value. Specifically, the photographing device control unit 144 controls the camera control device 22 such that, for example, the object 90 is photographed relatively large in the vicinity of the center of the image (e.g., the height of the object 90 in the image is about 50% of the height of the image) by panning, tilting, zooming, or the like. The camera control device 22 detects the object 90 from the image photographed by the photographing device 2 under the control of the photographing device control unit 144. Then, the camera control device 22 controls the image pickup device 2 so as to perform panning, tilting, zooming, and the like to track and photograph the object 90. On the other hand, the photographing device control unit 144 controls the camera control device 22 to move the photographing device 2 to a predetermined initial position when the evaluation value is equal to or less than the threshold value.

Figure 9:
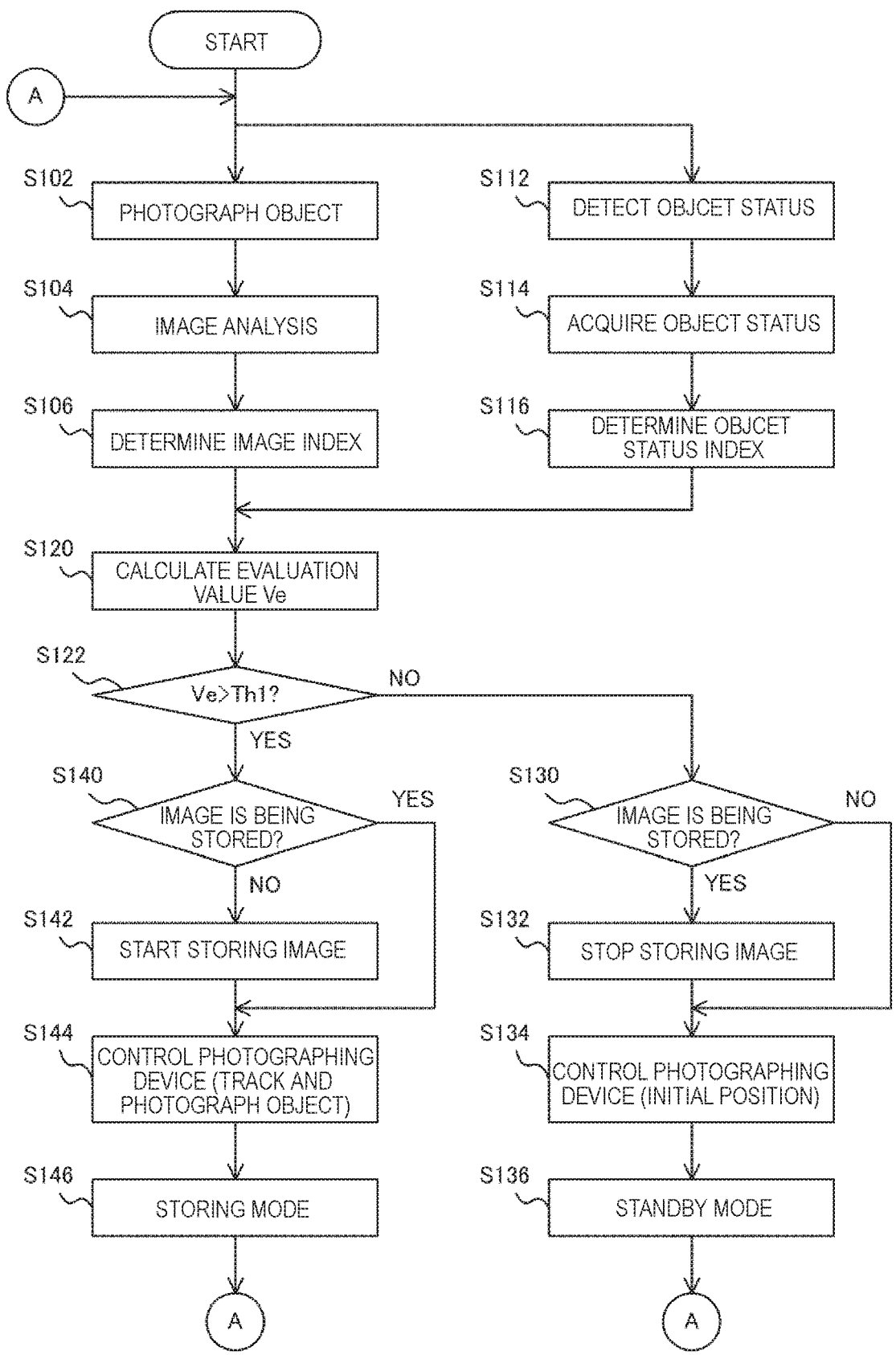
FIG. 9 is a flow chart showing the photographing control method performed by first embodiment photographing system.

FIG. 9 is a flow chart showing a photographing control process performed by the photographing system 1 according to the first embodiment. In step S102, the photographing device 2 photographs the object 90. An image obtained by photographing in the step S102 becomes an image to be evaluated for stored value. As described above, the image processing device 20 analyses the image to be evaluated in step S104. Next, the photographing control device 100 determines an image index in step S106. Specifically, the analysis result acquisition unit 112 acquires the analysis result data. As described above, the image index determination unit 114 determines the image index using the analysis result data.

On the other hand, as described above, the sensor 4 detects the status of the object 90 in step S112. Here, it is assumed that the timing of the step S112 is the same as the timing of the step S102. Next, the status acquisition unit 122 of the photographing control device 100 acquires the status (sensor data) of the object 90 via the sensor transmission/reception device 30 (step S114). Next, the status index determination unit 124 determines the object status index in step S116 as described above.

Next, as described above, in step S120, the evaluation value calculation unit 132 calculates the evaluation value Ve using the image index determined in the step S106 and the object status index determined in the step S116. The evaluation value determination unit 134 determines whether or not the evaluation value Ve exceeds the threshold value Th1 in step S122. When the evaluation value Ve is equal to or smaller than the threshold value Th1 (NO in step S122), the image storage control unit 142 determines whether or not the image is in the middle of storing (in step S130). If the image is being stored (YES in step S130), the image storage control unit 142 performs control so as to stop storing the image (in step S132). As a result, the image storage device 24 stops storing the image. At this time, the photographing device control unit 144 controls the photographing device 2 to move to the initial position (in step S134). If the image is not being stored (NO in step S130), the step S132 is skipped and the storing of the image is continued. Thus, if the evaluation value Ve is less than or equal to the threshold Th1, the photographing system 1 becomes standby mode such that the photographing device 2 is in the initial position without storing the image (in step S136). The process then returns to the step S102 and step S112.

On the other hand, when the evaluation value Ve exceeds the threshold value Th1 (Yes in step S122), the image storage control unit 142 determines whether or not the image is in the middle of storing (in step S140). If the image is not being stored (NO in step S140), the image storage control unit 142 performs control so as to start storing the image (in step S142). As a result, the image storage device 24 starts to store the image. At this time, the photographing device control unit 144 controls the photographing device 2 so as to track and photograph an image of the object 90 so as to capture an image of which the object 90 is conspicuous (in step S144). If the image is being stored (NO in step S140), the step S142 is skipped and the image storing process is continued. In this manner, when the evaluation value Ve exceeds the threshold value Th1, the photographing system 1 is in a storing mode in which the photographing device 2 is tracking and capturing the image of the object 90 after the image is stored (in step S146). The process then returns to the step S102 and step S112.

Figure 10:
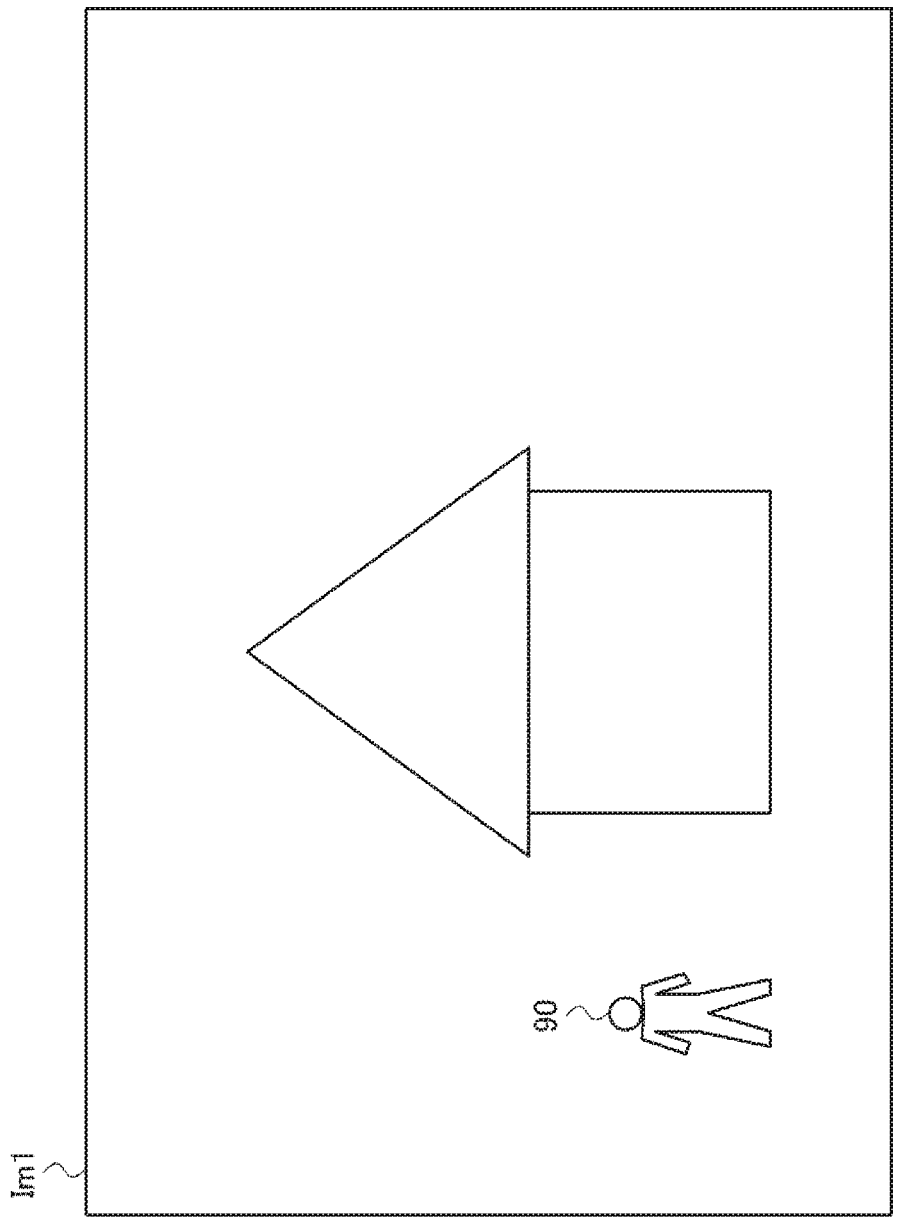
FIG. 10 is an example of an image in a standby mode.
Figure 11:
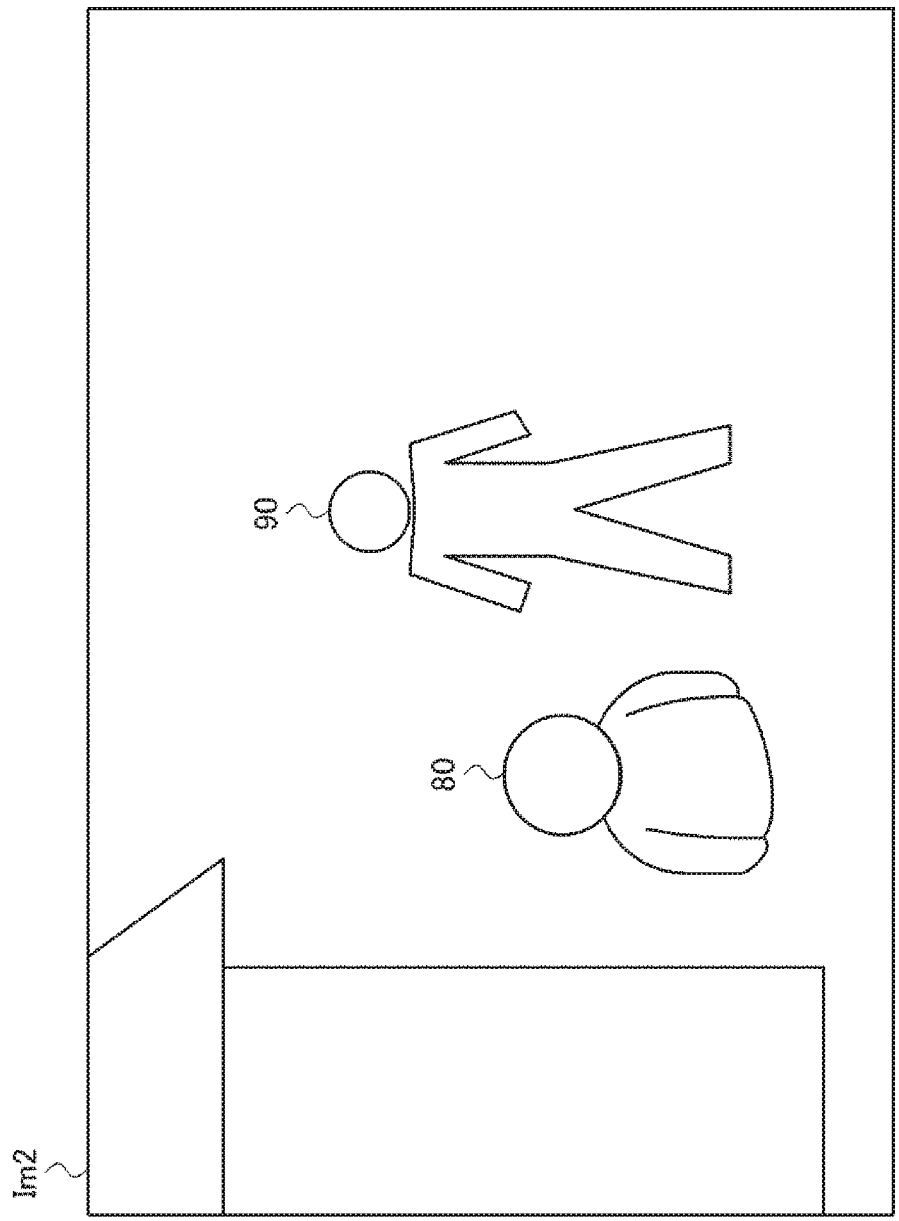
FIG. 11 is a diagram showing an image in a storing mode.

FIG. 10 is a diagram exemplifying an image Im1 in the standby mode. FIG. 11 is a diagram exemplifying an image Im2 in the storing mode. FIG. 12 is a diagram exemplifying a change in the evaluation value when the mode shifts from the standby mode (FIG. 10) to the storing mode (FIG. 11). As illustrated in FIG. 12, the Th1 of thresholds is set to 30.

As illustrated in FIG. 12, in the standby mode illustrated in FIG. 10, the image index determination unit 114 determines the degrees of the image indices "direction of the object", "distance to the object", "facial expression of the object (smile)", "facial expression of the object (surprise)", and "distance between the object and the characteristic object" as "7", "2", "0", "0", and "0", respectively. In addition, the status index determination unit 124 determines that the object status indices "pulse", "sweat", and "acceleration" are "2", "2", and "2", respectively. Although the object 90 is present in the image Im1, the object 90 is located at a position far from the photographing device 2, the size of the object 90 occupied in the image Im1 is small. Therefore, the degree of the index "distance to the object" is relatively small. Further, since the characteristic object is not in the vicinity of the object 90 and does not appear in the image Im1, the degree of the index "the distance between the object and the characteristic object" is "0". Further, since the emotion of the object 90 is not so excited and there is no facial expression such as smiling face or surprise, the degree of the indices "facial expression of the object (smiling face)" and "facial expression of the object (surprise)" is "0". In addition, since the emotion of the object is not so excited, the indices "pulse", "sweating" and "acceleration" are also not so high as and "2", "2" and "2", respectively. Therefore, in the standby mode illustrated in FIG. 10, the evaluation value Ve is 10.8 and the evaluation value Ve is equal to or less than the threshold value Th1 (=30).

As illustrated in FIG. 12, in the storing mode illustrated in FIG. 11, the image index determination unit 114 determines the degrees of the image indices "direction of the object", "distance to the object", "facial expression of the object (smile)", "facial expression of the object (surprise)", and "distance between the object and the characteristic object" as "7", "7", "7", "2", "10", respectively. In addition, the state index determination unit 124 determines that the object status indices "pulse", "sweating", and "acceleration" are "8", "4", and "4", respectively. Since the distance between the object 90 and the photographing device 2 is closer than the distance in the case of FIG. 10, the size of the object 90 in the image Im2 is larger than the distance in the case of FIG. 10. Therefore, the degree of the index "distance to the object" is "7", which is larger than that in the case of FIG. 10. Further, since the characteristic object 80 is close to the object 90, the degree of the index "distance between the object and the characteristic object" is "10". In addition, since the characteristic object 80 is in the vicinity of the object 90, the emotion of the object 90 is excited, and facial expressions such as smiling faces and surprises appear in the object 90. Therefore, the degree of the index "facial expression (smile) of the object" is "7", and the degree of "facial expression (surprise) of the object" is "2". Further, since the emotion of the object 90 is excited, the indices "pulse", "sweating" and "acceleration" become "8", "4" and "4", respectively, and become higher than in the case of FIG. 10. Therefore, in the storing mode illustrated in FIG. 11, the evaluation value Ve is 35.6, and the evaluation value Ve exceeds the threshold value Th1 (=30).

As described above, in the state exemplified in FIG. 11, the object 90 and the characteristic object 80 are close to each other, the distance from the photographing device 2 to the object 90 is substantially a distance suitable for photographing, and the emotion of the object 90 is excited and the facial expression can be rich. Therefore, it can be said that the image Im2 illustrated in FIG. 11 has stored value, that is, captures a crucial moment. The photographing control device 100 according to the first embodiment can store images capturing the status when the object 90 reaches the status corresponding to the crucial moment in this manner. Therefore, the photographing control device 100 according to the first embodiment can store images to be stored at appropriate timings.

The evaluation value calculating unit 132 according to the first embodiment is configured to calculate the sum of the product of the degree of each index and a weight coefficient set in advance for each index as an evaluation value. As a result, the stored value of the image can be evaluated with higher accuracy by increasing the weight coefficient of the index having high importance in evaluating the stored value of the image. That is, the higher the index of higher importance, the more reliably the image can be stored. Therefore, it is possible to store an image to be stored with higher accuracy.

The image storage control unit 142 according to the first embodiment is configured not to store an image when the evaluation value Ve is equal to or smaller than the threshold value Th1. As a result, it is possible to suppress the storage of an image having a low stored value. Therefore, the storage capacity of the image storage device 24 can be suppressed from being compressed, and the storage capacity of the image storage device 24 can be saved.

In addition, the photographing device control unit 144 according to the first embodiment is configured to control the photographing device 2 so that the object 90 is tracked and photographed in order to photograph an image in which the object is conspicuous when the evaluation value Ve exceeds the threshold value Th1. This makes it easier to photograph the image of the object 90 which is worth storing. Therefore, it is possible to make it easier to photograph an image that captures the crucial moment of the object 90.

Modified Example of First Embodiment

In the first embodiment described above, it was assumed that the threshold value corresponding to the timing of starting to store an image and the threshold value corresponding to the timing of discontinuing to store an image are the same as each other (Th1; first threshold value, second threshold value). However, the threshold value corresponding to the timing of starting to store the image and the threshold value corresponding to the timing of discontinuing to store the image may be different from each other. This can also be applied to other embodiments described later.

Figure 13:
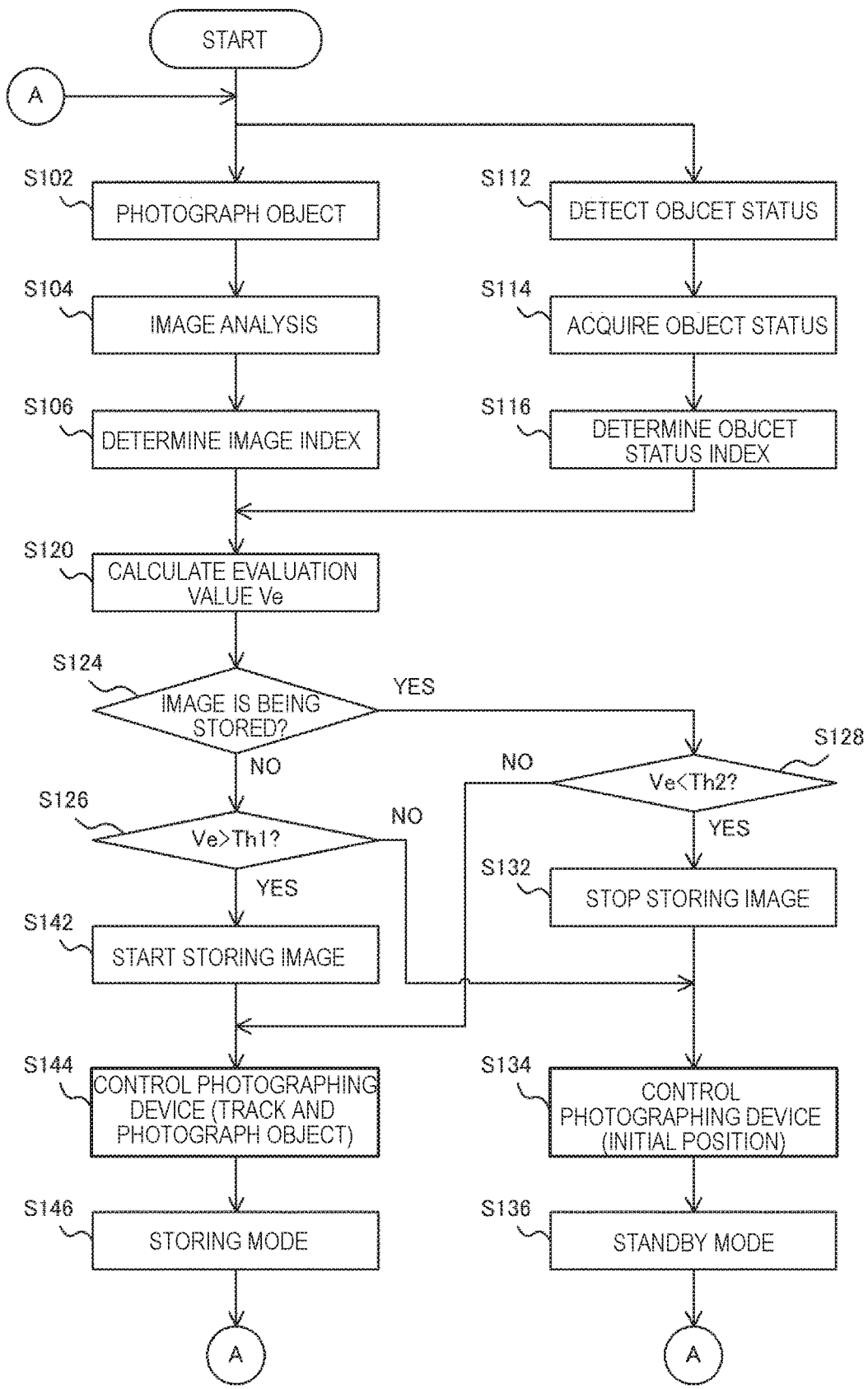
FIG. 13 is a flow chart showing the photographing control system for the modified example of first embodiment.

FIG. 13 is a flow chart showing a photographing control process according to the modified example of the first embodiment. Here, the storage starting threshold for starting the storage of the image when the image is not stored is Th1 (first threshold), and the storage stopping threshold for stopping the storage of the image when the image is stored is Th2 (second threshold). Note that Th1>Th2 is used. Since the step S102-step S120 processes are substantially the same as the processes shown in FIG. 9, the explanation thereof is omitted.

The evaluation value determination unit 134 determines whether or not images are being stored (in step S124). When the image is not being stored (NO in step S124), the evaluation value determination unit 134 determines whether or not the evaluation value Ve exceeds the storage start threshold value Th1 (in step S126). When the evaluation value Ve exceeds the storage start threshold value Th1 (Yes in S126), the image storage control unit 142 performs control so as to start storage of the image (S142). As a result, the image storage device 24 starts to store the image. At this time, the photographing device control unit 144 controls the photographing device 2 to track and photograph the image of the object 90 (step S144). In this way, the photographing system 1 is in storing mode in step S146. On the other hand, when the evaluation value Ve is equal to or smaller than the storage start threshold value Th1 (NO in step S126), the image storage control unit 142 determines that the image storage is not started. At this time, the photographing device control unit 144 controls the photographing device 2 so as to position the photographing device 2 at the initial position (step S134). In this way, the photographing system 1 continues the standby mode (step S136).

On the other hand, when the image is being stored (YES in step S124), the evaluation value determination unit 134 determines whether or not the evaluation value Ve is lower than the storage stop threshold value Th2 (step S128). When the evaluation value Ve is lower than the storage stop threshold value Th2 (Yes in step S128), the image saving control unit 142 performs control so as to stop saving the image (step S132). As a result, the image storage device 24 stops storing the image. At this time, the photographing device control unit 144 controls the photographing device 2 to move the photographing device 2 to the initial position (step S134). In this way, the photographing system 1 is step S136. On the other hand, when the evaluation value Ve is equal to or larger than the storage stop threshold Th2 (NO in step S128), the image storage control unit 142 determines that the image storing is not stopped. At this time, the photographing device control unit 144 controls the photographing device 2 to track and photograph the image of the object 90 (step S144). In this way, the photographing system 1 continues to be stored (step S146).

The photographing control device 100 according to the modified example of the first embodiment is configured to compare thresholds, which differ depending on whether or not images are being stored, with the evaluation value. This suppresses the sudden stop of storing images when the evaluation value immediately falls below the threshold Th1 after the evaluation value exceeds the threshold Th1. Therefore, it is possible to suppress frequent repetition of the start and stop of storing when the evaluation value rises and falls in the vicinity of one threshold.

Second Embodiment

Next, second embodiment will be described. The second embodiment differs from the first embodiment in that there are a plurality of objects 90 to which the sensor 4 is attached. Other configurations of the second embodiment are substantially the same as those of the first embodiment.

Figure 14:
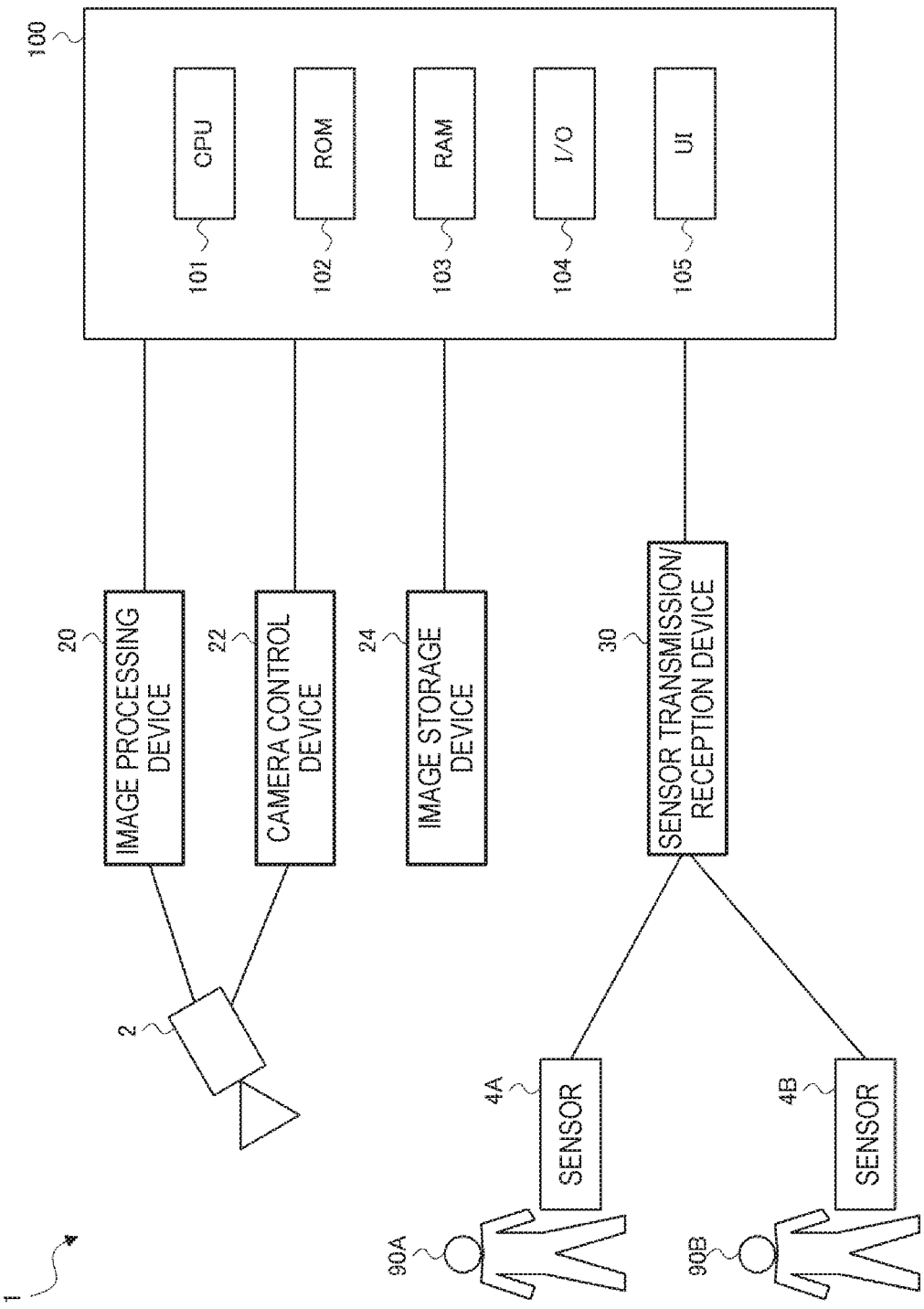
FIG. 14 is a diagram showing the configuration of the photographing system related to second embodiment.

FIG. 14 is a diagram showing a configuration of the photographing system 1 according to the second embodiment. The photographing system 1 according to the second embodiment includes one or more photographing device 2, one or more sensors 4A, 4B, an image processing device 20, a camera control device 22, an image storage device 24, a sensor transmission/reception device 30, and an photographing control device 100. In the example of FIG. 14, the objects 90A and 90B can be photographed. At this time, it is assumed that the information of the object 90A and the information of the object 90B (identification information, facial information, height, etc.) is registered in advance in the photographing control device 100.

The sensor 4A detects the status of the object 90A. The sensor 4A may be mounted on the object 90A or carried by the object 90A. The sensor 4B detects the status of the object 90B. The sensor 4B may be mounted on the object 90B or carried by the object 90B. The sensor transmission/reception device 30 receives signals transmitted from each sensor 4A,4B, and transmits the signals as sensor data to the photographing control device 100. At this time, the sensor transmission/reception device 30 makes the sensor data of the object 90A and the sensor data of the object 90B distinguishable from each other, and then transmits the sensor data to the photographing control device 100. In FIG. 14, two objects 90A and 90B are shown, and the sensor 4A,4B is attached to each of them, but the number of objects 90 may be three or more. In this case, the sensor 4 is mounted on each of the three or more objects 90.

The configurations of the photographing device 2, the image processing device 20, the camera control device 22, the image storage device 24, and the photographing control device 100 are substantially the same as those of the first embodiment, and therefore descriptions thereof are omitted. Note that the image processing device 20 can perform image analysis on each of the object 90A and the object 90B. For example, the image processing device 20 performs direction determination, distance determination, facial expression determination, and the like on each of the object 90A and the object 90B.

Figure 15:
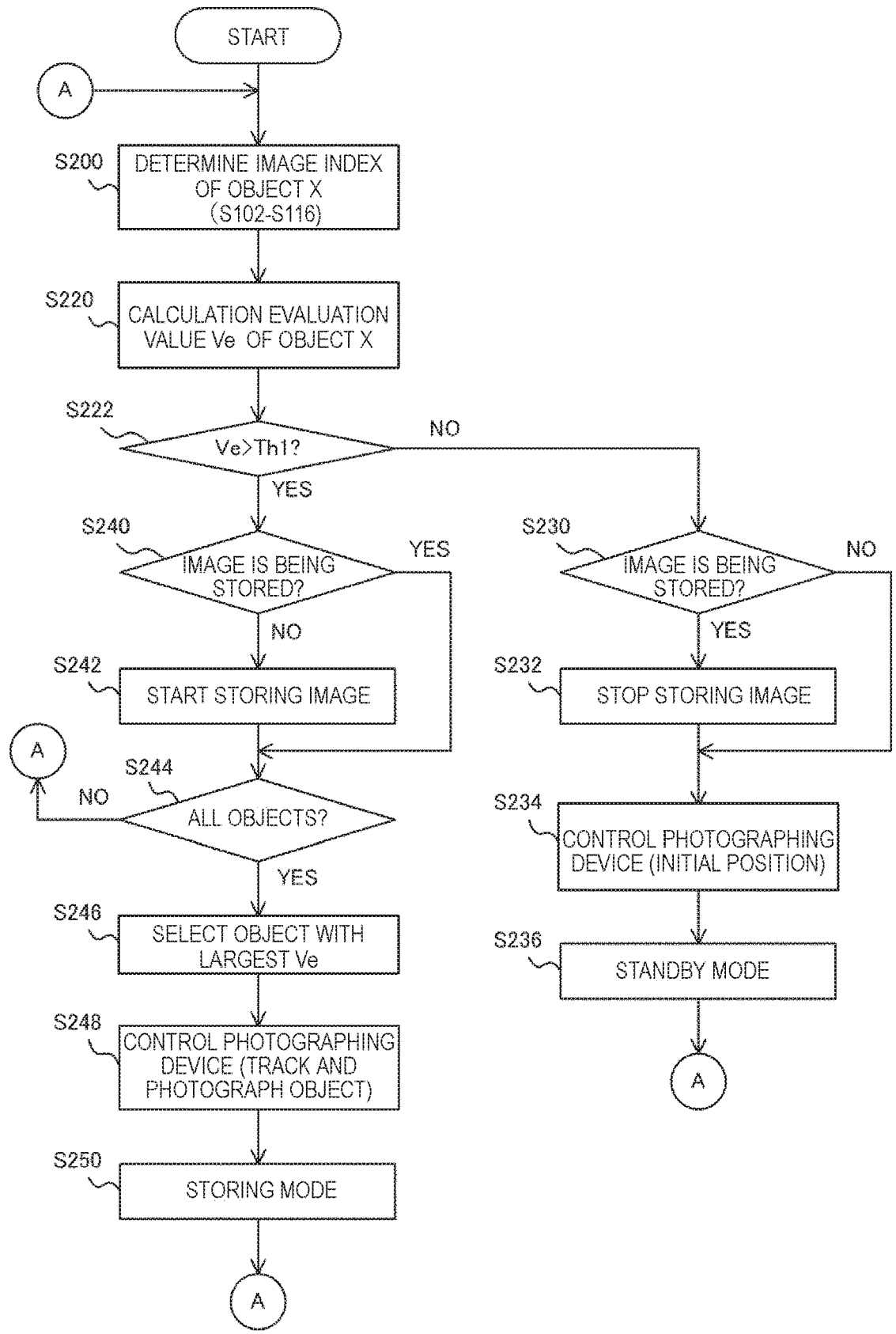
FIG. 15 is a flow chart showing the photographing control method performed by second embodiment photographing system.

FIG. 15 is a flow chart showing a photographing control process performed by the photographing system 1 according to the second embodiment. The photographing control device 100 determines an index of a certain object X (step S200), and calculates an evaluation value Ve for the object X (step S220). In the step S200, the essentially same processes as the steps S102-S116 shown in FIG. 9 is performed for object X (either object 90A or 90B).

For example, the analysis result acquisition unit 112 acquires the analysis result data obtained by the image analysis (step S104) using the image in which the object 90A is photographed. The image index determination unit 114 determines an image index for the object 90A using the analysis result data for the object 90A (step S106). The status acquisition unit 122 acquires the status of the object 90A from the sensor 4A (step S114). The status index determination unit 124 determines an object status index for the object 90A (step S116). Then, the evaluation value calculation unit 132 calculates an evaluation value Ve for the object 90A using the image index for the object 90A and the object status index for the object 90A in the same manner as in the step S120.

The evaluation value determination unit 134 determines whether or not the evaluation value Ve relating to the object X (for example, the object 90A) exceeds the threshold value Th1 (step S222). When the evaluation value Ve relating to the object X is equal to or smaller than the threshold value Th1 (NO in step S222), the steps S230-S236 is performed on the object X. The steps S232-S236 are substantially the same as the steps S130-S136 shown in FIG. 9. That is, in this case, the image of the object X is not stored.

On the other hand, when the evaluation value Ve of the object X exceeds the threshold value Th1 (Yes in step S222), the image storage control unit 142 determines whether or not the image of the object X is in the middle of storing (step S240). When the image of the object X is not being stored (NO in step S240), the image storage control unit 142 performs control so as to start storing the image (step S242). As a result, the image storage device 24 starts to store the image of the object X. If the image of the object X is being stored (NO in step S240), the step S242 process is skipped, and the image storing process of the object X is continued.

Next, the photographing control device 100 (for example, the evaluation value determination unit 134) determines whether or not the evaluation values Ve have been calculated for all the objects 90 (step S244). When the evaluation value Ve has not been calculated for all the objects 90 (NO in the S244), the process returns to the step S200, and the photographing control device 100 determines the image index (step S200) for the object 90 (for example, the object 90B) for which the evaluation value Ve has not been calculated, and calculates the evaluation value Ve (step S220). The steps S222-S242 are then repeated. That is, for example, when the evaluation value Ve of the object 90B is equal to or smaller than the threshold value Th1, the photographing control device 100 performs control so as not to store images of the object 90B. On the other hand, when the evaluation value Ve of the object 90B exceeds the threshold value Th1, the photographing control device 100 performs control so as to save the image of the object 90B. As described above, the index determination unit 13 (the image index determination unit 114 and the status index determination unit 124) related to the second embodiment determines the degree of the index for each of the plurality of objects 90. The evaluation value calculation unit 132 according to the second embodiment calculates an evaluation value for each of the plurality of objects 90. In addition, the evaluation value determination unit 134 according to the second embodiment determines the stored value of the images for each of the plurality of objects 90.

On the other hand, when the evaluation value Ve is calculated for all the objects 90 (Yes in step S244), the evaluation value determination unit 134 selects the object 90 having the largest evaluation value Ve (Step S246). Then, the photographing device control unit 144 controls the photographing device 2 so that the selected object 90 is tracked and photographed in step S248. As a result, the photographing system 1 is in storing mode (step S250). That is, the photographing device control unit 144 according to the second embodiment controls the photographing device 2 so that an image in which the object 90 having the largest evaluated values is noticeable can be photographed. For example, in the example shown in FIG. 14, when the evaluation value Ve of the object 90A is larger than the evaluation value Ve of the object 90B, the photographing device control unit 144 controls the photographing device 2 so as to track and photograph the object 90A. At this time, another photographing device may photograph the object 90B whose evaluation value Ve is not the largest evaluation value Ve.

Figure 16:
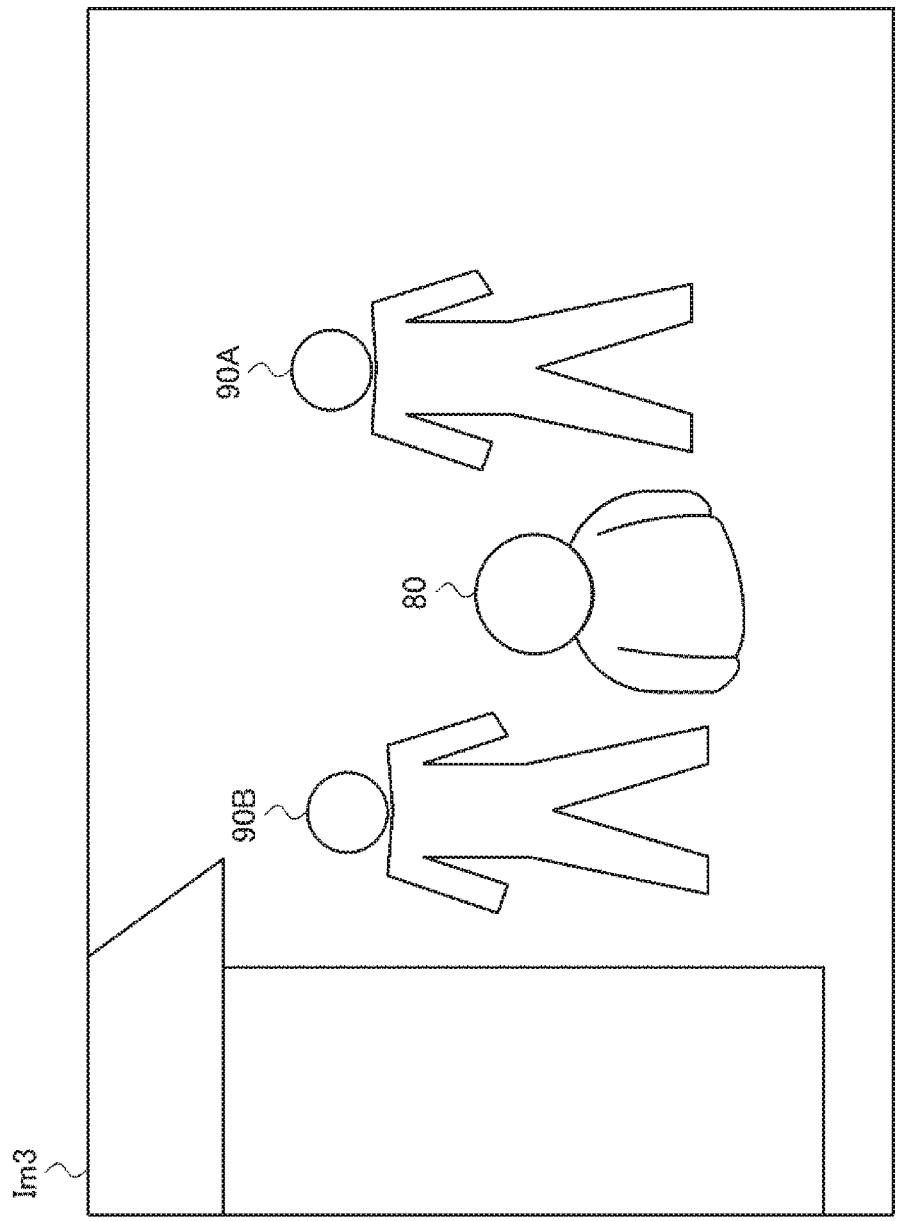
FIG. 16 is a diagram showing an image in which multiple objects are photographed.

FIG. 16 is a diagram exemplifying an image Im3 in which a plurality of objects 90 are displayed. FIG. 17 is a diagram exemplifying a change in the evaluation value regarding a certain object 90 shown in the image shown in FIG. 16. Two objects 90A and 90B and a characteristic object 80 are shown in the image Im3. Here, FIG. 17 shows a change in the evaluation value of the object 90B. It is assumed that the change in the evaluation value of the object 90A is shown in FIG. 12.

First, it is assumed that the image Im1 illustrated in FIG. 10 is photographed by the photographing device 2, and then the image Im2 illustrated in FIG. 11 is photographed. It is assumed that the object 90A is shown in FIGS. 10 and 11. Further, it is assumed that the image Im3 illustrated in FIG. 16 is photographed. It is also assumed that the values on the right side of the arrows in the degrees, weighting points and evaluation values shown in FIG. 12 correspond to FIGS. 11 and 16. It is also assumed that the values on the left side of the arrows in the degrees, weighting points and evaluation values shown in FIG. 17 correspond to FIGS. 10 and 11, and the values on the right side of the arrows correspond to FIG. 16.

At the time point when the image Im2 shown in FIG. 11 is photographed, only the object 90A is photographed, so that the evaluation value Ve for the object 90A becomes high. In the example shown in FIG. 12, the evaluation value Ve is 35.6. On the other hand, since the object 90B does not appear in the image Im2, as shown in FIG. 17, the degrees of the respective image indexes of the object 90B are all 0, and the evaluation value Ve of the object 90B is 1.4 which is considerably low. Therefore, in the condition shown in FIG. 11, the photographing control device 100 performs control so as to store the image of the object 90A and track and photograph the object 90A.

Then, as shown in FIG. 16, it is assumed that the object 90B approaches the characteristic object 80 and is photographed by the photographing device 2 together with the object 90A. At this time, as shown in FIG. 17, the degree of each index relating to the object 90B greatly increases, and the evaluation value Ve relating to the object 90B becomes 45.4. As a result, since the evaluation value Ve relating to the object 90B exceeds the threshold value Th1, the image of the object 90B as well as the image of the object 90A is stored. At this time, the evaluation value Ve relating to the object 90B is larger than the evaluation value Ve relating to the object 90A. In other words, it can be said that the object 90B having a high evaluation value Ve has a higher possibility of inducing a crucial moment than the object 90A. Therefore, the photographing control device 100 controls the photographing device 2 so as to track and photograph object 90B.

As described above, when there are a plurality of photographed objects 90, the photographing control device 100 according to the second embodiment determines the degree of the index for each of the plurality of objects 90, and calculates the evaluated values for each of the plurality of objects 90. Then, the photographing control device 100 according to the second embodiment controls the photographing device 2 to track and photograph the object 90 so that the object 90 with the largest evaluated values can be conspicuously photographed. A crucial moment of the object 90 that is more likely to induce a crucial moment is easily photographed. In other words, it becomes easier to photograph the object 90 which is more likely to cause an image with high stored value. Therefore, the photographing control device 100 according to the second embodiment can more reliably photograph and store images with higher stored value. Further, the photographing control device 100 according to the second embodiment can exhibit substantially the same effect as the effect exhibited by the photographing control device 100 according to the first embodiment as described above.

Third Embodiment

Next, third embodiment will be described. The third embodiment differs from the other embodiments in that the effect by the characteristic object 80 is improved. In the third embodiment, it is assumed that the characteristic object 80 is an operable mascot character. It is assumed that the characteristic object 80, which is a mascot character, is capable of performing an effect for enjoying the object 90.

Figure 18:
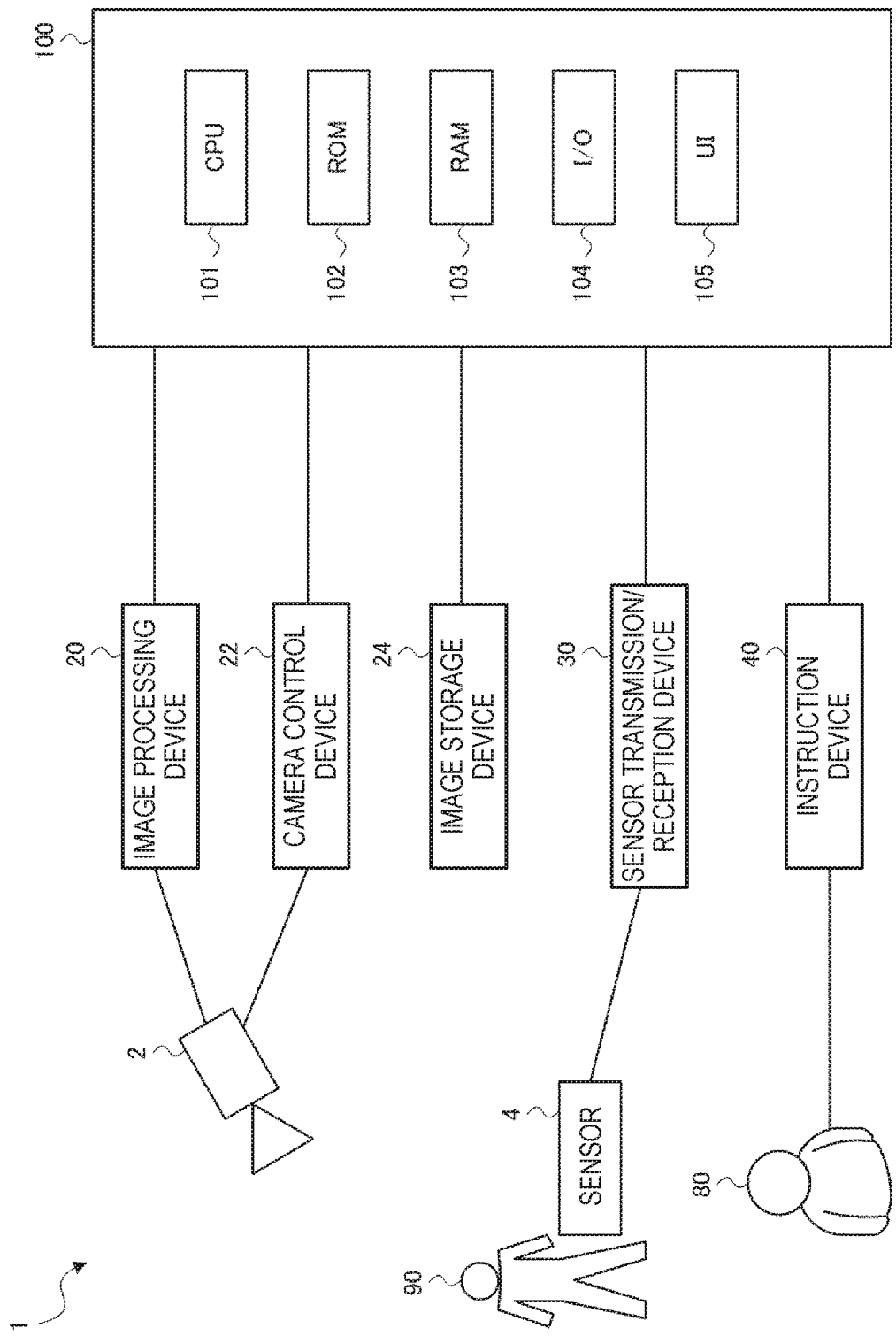
FIG. 18 is a diagram showing the configuration of the photographing system related to third embodiment.

FIG. 18 is a diagram showing a configuration of the photographing system 1 according to the third embodiment. The photographing system 1 according to the third embodiment includes one or more photographing device 2, one or more sensors 4, an image processing device 20, a camera control device 22, an image storage device 24, a sensor transmission/reception device 30, an instruction device 40, and an photographing control device 100. The configurations of the photographing device 2, the sensor 4, the image processing device 20, the camera control device 22, the image storage device 24, and the photographing control device 100 are substantially the same as those of the first embodiment, and therefore descriptions thereof are omitted. The instruction device 40 is connected to the photographing control device 100 via wired or wirelessly. The instruction device 40 is a device for instructing the characteristic object 80, which is a mascot character, to improve the effect. When the worker manually remotely operates the characteristic object 80 or when the worker enters and operates the characteristic object 80, the instruction device 40 may be a speaker for outputting sound for transmitting an instruction to the worker, or a display for outputting a window for transmitting an instruction, or the like. When the characteristic object 80 is a robot capable of autonomously operating, the instruction device 40 transmits signals indicating predetermined instructions to the robot. In the example described below, a case where the operator operates the characteristic object 80 will be described.

Figure 19:
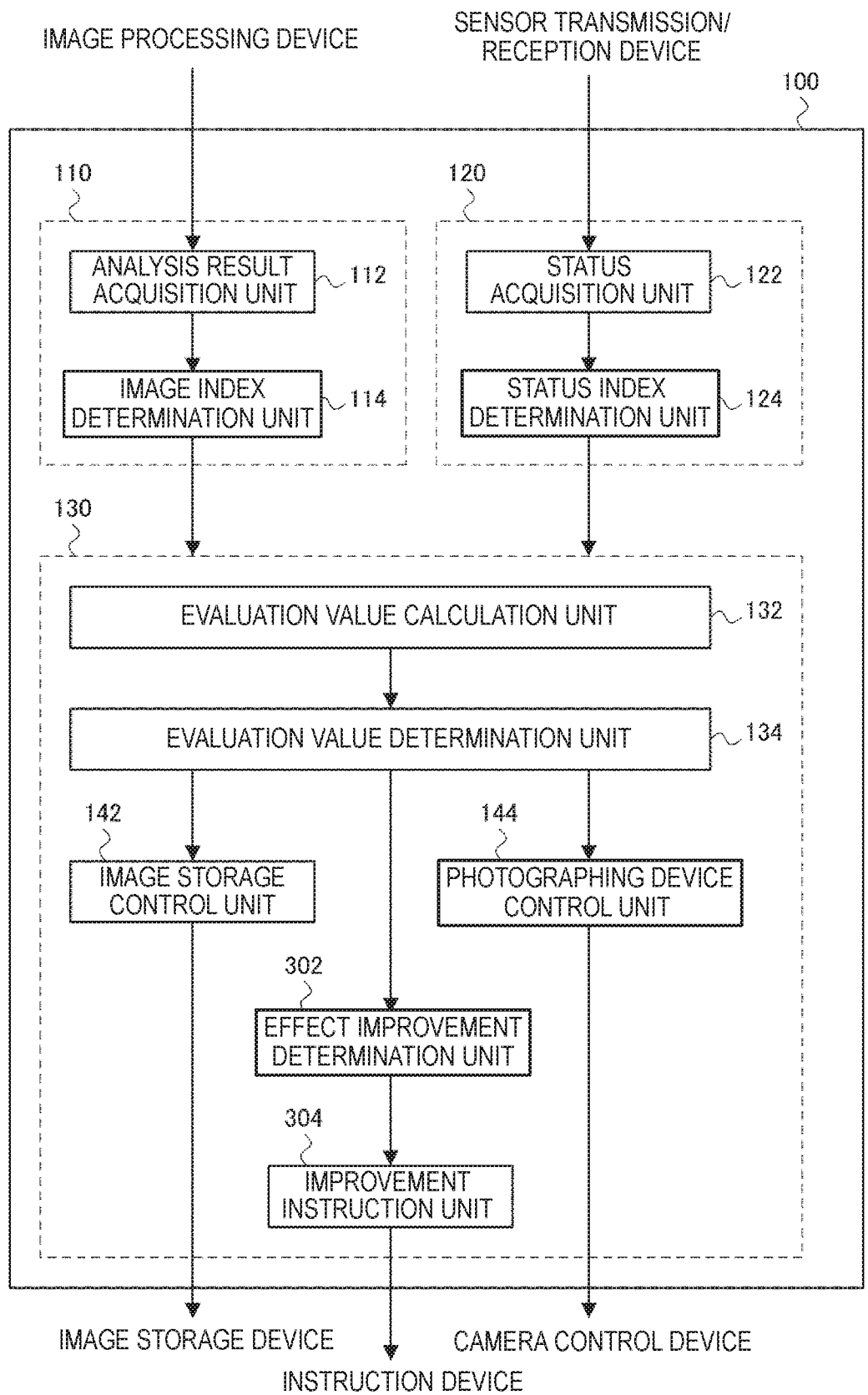
FIG. 19 is a functional block diagram showing the configuration of the photographing control device for third embodiment.

FIG. 19 is a functional block diagram showing a configuration of the photographing control device 100 according to the third embodiment. The photographing control device 100 according to the third embodiment includes an analysis result acquisition unit 112, an image index determination unit 114, a status acquisition unit 122, a status index determination unit 124, an evaluation value calculation unit 132, an evaluation value determination unit 134, an image storage control unit 142, and an photographing device control unit 144. Further, the photographing control device 100 according to the third embodiment includes an effect improvement determination unit 302 and an improvement instruction unit 304. The effect improvement determination unit 302 and the improvement instruction unit 304 may be realized by the photographing calculation device 130. Components other than the effect improvement determination unit 302 and the improvement instruction unit 304 are substantially the same as those shown in FIG. 4, and therefore description thereof is omitted.

The effect improvement determination unit 302 determines whether or not it is necessary to improve the effect of the characteristic object 80. When it is necessary to improve the effect of the characteristic object 80, an instruction is transmitted to the improvement instruction unit 304. When it is determined that the effect of the characteristic object 80 needs to be improved, the improvement instruction unit 304 transmits an instruction for improving the effect of the characteristic object 80 to the instruction device 40. The concrete processing of the effect improvement determination unit 302 and the improvement instruction unit 304 will be described with reference to FIG. 20.

Figure 20:
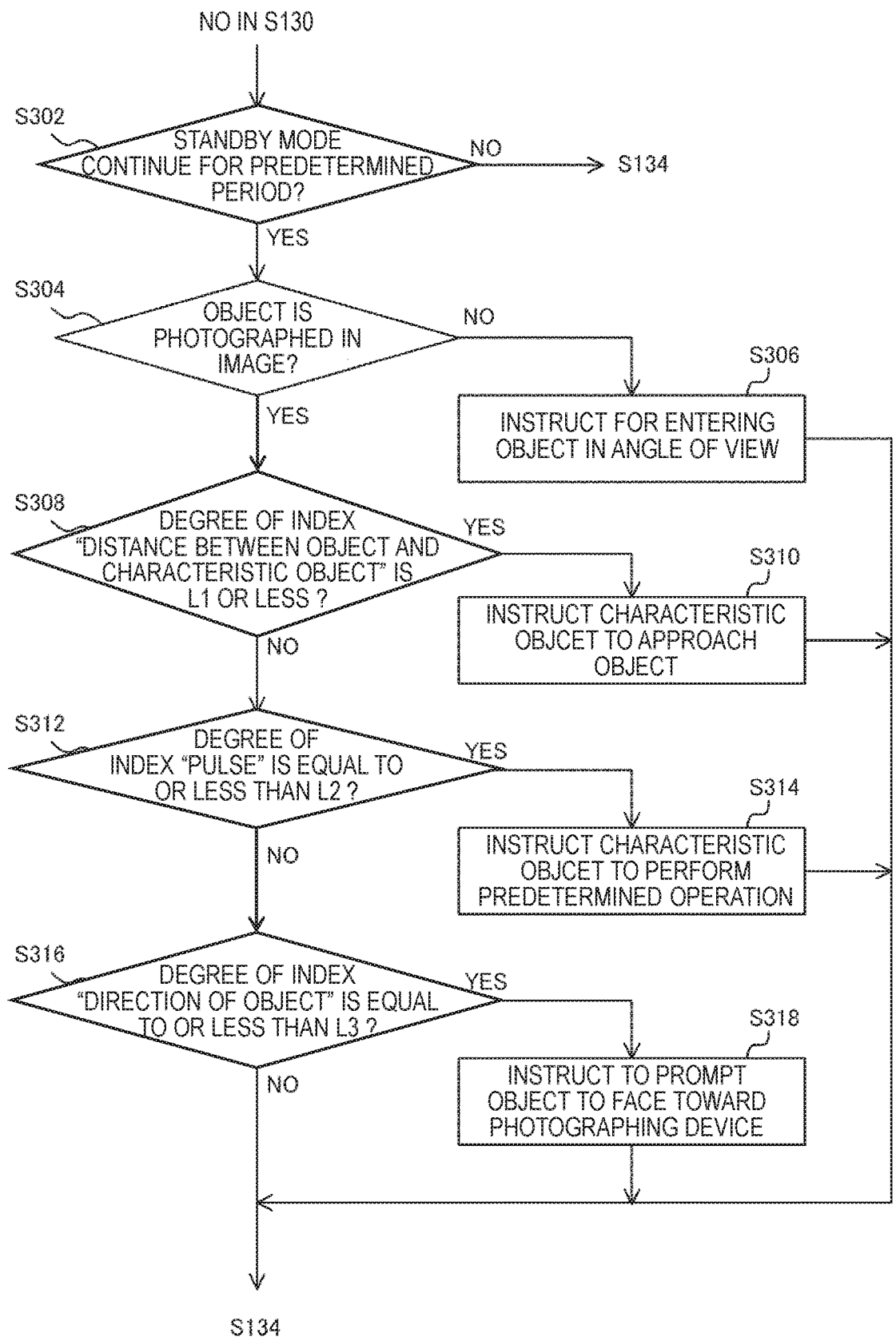
FIG. 20 is a flow chart showing the photographing control method performed by the photographing control device for third embodiment.

FIG. 20 is a flow chart showing a photographing control process performed by the photographing control device 100 according to the third embodiment. In the flow chart shown in FIG. 9, the steps shown in FIG. 20 are performed when the determination of the step S130 is NO, that is, when the evaluation value Ve is equal to or smaller than the threshold value Th1 and the image is not being stored. In other words, it is performed when the photographing system 1 is in a standby mode.

In step S302, the effect improvement determination unit 302 determines whether or not the standby mode continues for a predetermined period. If the standby mode has not continued for a predetermined period (NO in step S302), the effect improvement determination unit 302 determines that improvement of the effect of the characteristic object 80 is not required, and the process proceeds to step S134. On the other hand, when the standby mode continues for a predetermined period (Yes in step S302), the effect improvement determination unit 302 judgments that the effect of the characteristic object 80 needs to be improved. In step S304, the effect improvement determination unit 302 determines whether or not the object 90 is photographed in the image, for example, by using the analysis result data.

When the object 90 is not photographed in the image (NO in step S304), the improvement instruction unit 304 transmits an instruction to the instruction device 40 so that the object 90 enter the angle of view of the photographing device 2 (step S306). Then, the process proceeds to step S134. For example, the improvement instruction unit 304 causes the instruction device 40 to output a sound or an indication such as "prompt the object in front of the photographing device". Note that this instruction may be performed not only when the object 90 does not appear at all in the image, but also when a part of the object 90 (e.g., the face of the object 90) is hidden behind an obstacle or the like that blocks imaging. According to the instruction by the instruction device 40, the operator can perform an operation of causing the characteristic object 80 to perform an operation of urging the object 90 in front of the photographing device 2.

On the other hand, when the object 90 is in the image (Yes in step S304), the effect improvement determination unit 302 determines whether or not the degree of the index "the distance between the object and the characteristic object" is equal to or less than a predetermined L1 (step S308). When the degree of the index "distance between the object and the characteristic object" is L1 (e.g., "7") or less (Yes in step S308), the effect improvement determination unit 302 determines that the distance between the object 90 and the characteristic object 80 is too long. In step S310, the improvement instruction unit 304 transmits an instruction to move the characteristic object 80 closer to the object 90 to the instruction device 40. Then, the process proceeds to step S134. For example, the improvement instruction unit 304 causes the instruction device 40 to output a sound or an indication such as "Please approach the object". According to the instruction by the instruction device 40, the operator can perform an operation of causing the characteristic object 80 to perform an operation of approaching the object 90.

On the other hand, when the degree of the index "distance between the object and the characteristic object" exceeds L1 (NO in step S308), the effect improvement determination unit 302 determines whether or not the degree of the index "pulse" is equal to or less than a predetermined L2 (step S312). When the degree of the index "pulse" is equal to or less than L2 (for example, "5") (YES in step S312), the effect improvement determination unit 302 determines that the object 90 is not excited. In step S314, the improvement instructing unit 304 transmits to the instruction device 40 an instruction to cause the characteristic object 80 to perform a predetermined operation. Then, the process proceeds to step S134. Here, the predetermined operation is an operation in which the object 90 is expected to be pleased and excited, for example, the characteristic object 80 waves a hand to the object 90, touches the object 90, or calls the name or nickname of the object 90. For example, the improvement instruction unit 304 causes the instruction device 40 to output a sound or an indication such as "Please wave a hand to the object". It is assumed that the name or nickname of the object 90 is registered in advance. According to the instruction by the instruction device 40, the operator can perform an operation of causing the characteristic object 80 to perform an operation such that the object 90 is excited.

On the other hand, when the degree of the index "pulse" exceeds L2 (NO in step S312), the effect improvement determination unit 302 determines whether or not the degree of the index "direction of the object" is equal to or less than a predetermined L3 (step S316). When the degree of the index "direction of the object" is equal to or less than L3 (e.g., "6") (Yes in step S316), the effect improvement determination unit 302 determines that the object 90 does not face toward the photographing device 2 as much as the stored value of the image is. Then, the improvement instruction unit 304 transmits an instruction to prompt the object 90 to face toward the photographing device 2 to the instruction device 40 (step S318). Then, the process proceeds to step S134. For example, the improvement instruction unit 304 causes the instruction device 40 to output a sound or an indication such as "prompt the object to face the photographing device". According to the instruction by the instruction device 40, the operator can perform an operation of causing the characteristic object 80 to perform an operation such as pointing toward the photographing device 2.

It is expected that the effect of the characteristic object 80 is improved by the step S306, the step S310, the step S314, or the step S318, so that the the object 90 is excited and a crucial moment is induced, and the evaluation value Ve is increased. Then, the evaluation value Ve is calculated again by the processing of the S102-S120 (FIG. 9), and when it is determined that the evaluation value Ve exceeds the threshold value Th1 by the step S122 (FIG. 9), storing images is started (S142). When the degree of the index "direction of the object" exceeds L3 (NO in step S316), the process proceeds to S134. When the evaluation value Ve does not exceed the threshold value Th1 even if the improvement of the effect described above is performed for a certain period, the effect improvement determination unit 302 may abandon making the evaluation value Ve exceed the threshold value Th1 by the improvement of the effect.

FIG. 21 is a diagram exemplifying that the evaluation value has increased due to the improvement of the effect performed by the photographing control device 100 according to the third embodiment. Here, L1=7, L2=5, L3=6, and Th1=35. First, before the effect is improved, since the degree of the index "distance between the object and the characteristic object" is "1", the effect improvement determination unit 302 determines that the degree of the index "distance between the object and the characteristic object" is equal to or less than L1. Then, the improvement instruction unit 304 transmits an instruction to move the characteristic object 80 closer to the object 90 to the instruction device 40 (step S310). As a result, the degree of the index "distance between the object and the characteristic object" can be increased to "10".

Before the effect is improved, since the degree of the index "pulse" is "2", the effect improvement determination unit 302 determines that the degree of the index "pulse" is equal to or less than L2. Then, the improvement instruction unit 304 transmits an instruction to cause the characteristic object 80 to perform a predetermined operation to the instruction device (step S314). Thereby, the object 90 may be excited, and the degree of the index "pulse" may increase to "8".

Before the effect is improved, since the degree of the index "direction of the object" is "2", the effect improvement determination unit 302 determines that the degree of the index "direction of the object" is equal to or less than L3.

Then, the improvement instruction unit 304 transmits an instruction to prompt the object 90 to face the photographing device 2 to the instruction device 40 (step S318). As a result, the degree of the index "direction of the object" can be increased to "7".

As a result, the evaluation value Ve is 16.6 and is equal to or less than the threshold value Th1 prior to the improvement of the effect, whereas after the improvement of the effect, the evaluation value Ve rises to 35.6 and exceeds the threshold value Th1. Therefore, the image of the object 90 has storage value. As a result, the storing this image is started.

In this manner, the photographing control device 100 according to the third embodiment can instruct the characteristic object 80 to prompt the object 90 to increase the evaluation value Ve when the evaluation value Ve is low. This makes it possible to intentionally induce a crucial moment of the object 90. Therefore, it is possible to increase the opportunity to store an image. Further, the photographing control device 100 according to the third embodiment can exhibit substantially the same effect as the effect exhibited by the photographing control device 100 according to the first embodiment as described above.

In the example shown in FIG. 20, the effect improvement determination unit 302 determines whether or not to improve the effect according to the degree of the indices "distance between the object and the characteristic object", "pulse" and "direction of the object", but the present invention is not limited to such a configuration. The effect improvement determination unit 302 may determine whether or not to improve the effect according to the degree of another index, in particular, an index having a relatively large weighting coefficient.

Modified Example

The present embodiment is not limited to the above embodiment and can be appropriately changed within a scope not deviating from the gist. For example, the plurality of embodiments described above are mutually applicable. For example, the third embodiment configuration may be applied to the second embodiment.

In the flow chart according to the above embodiment, the order of each process can be changed as appropriate. One or more of the processes in the flow chart according to the above-described embodiment may not be performed. For example, in the flow chart shown in FIG. 20, the order of the steps S308 and S310, the steps S312 and S314, and the steps S316 and S318 may be changed. For example, the processing of the steps S308 and S310 may be after the processing of the steps S312 and S314. The step S302 of FIG. 20 may be omitted. In other words, the effect improvement determination unit 302 may determine whether or not to improve the effect immediately when the standby mode does not continue for a predetermined period of time.

In the above-described embodiment, the evaluation value calculation unit 132 calculates the sum of the products of the degree of the index and the weight coefficient as the evaluation value Ve, but the present invention is not limited to such a configuration. The evaluation value calculation unit 132 may calculate the evaluation value Ve by simply summing the degrees of the indices without multiplying the degrees of the indices by the weight coefficients. However, as described above, by multiplying the degree of the index by the weight coefficient, it is possible to store an image to be stored with higher accuracy.

In the above-described embodiment, when the evaluation value Ve exceeds the threshold value Th1, the image is stored, and the object 90 is tracked and photographed; however, the present invention is not limited to such a configuration. The threshold value that is a trigger for tracking photographing of the object 90 may be different from the threshold value that is a trigger for storing the image. That is, images may be stored when the evaluation value Ve exceeds the threshold value Th1, and the object 90 may be tracked and photographed when the evaluation value Ve exceeds the threshold value Th3.

Further, in the above-described embodiment, the photographing device 2 is positioned at the initial position as the standby mode when the image is not being stored, but the present invention is not limited to such a configuration. In the standby mode, the object 90 may be searched using the photographing device 2 or another photographing device. In this case, when the position information of the object 90 can be detected, the object 90 may be searched using the position information of the object 90. By doing so, it is possible to increase the photographing opportunity.

In the above-described embodiment, the images are continuously stored whenever the evaluation value Ve exceeds the threshold value Th1, but the present invention is not limited to such a configuration. The storing the image may be stopped when a predetermined period of time elapses during which the image is continuously stored. As a result, it is possible to suppress the compression of the storage capacity of the image storage device 24 and to save the storage capacity.

The image indexes are not limited to that illustrated in FIG. 5. The image indexes may be part of FIG. 5 or may include other image indexes. For example, the image index determination unit 114 may use the motion of the object 90 as an image index. Specifically, the image processing device 20 detects the motion of the object 90 by a technique such as motion capture. Then, when the movement of the object 90 represents the emotion of the object 90 (e.g., banzaing, etc.), the image index determination unit 114 may determine the degree of the image index in accordance with the magnitude of the movement, etc.

The image index determination unit 114 may use the direction of the characteristic object with respect to the photographing device 2 as an image index. For example, when the characteristic object is a mascot character, the image processing device 20 may determine the direction of the portion corresponding to the face of the mascot character in the same manner as the determination of the direction of the object 90. The image index determination unit 114 may increase the degree of the image index as the direction of the mascot character is directed toward the photographing device 2.

Further, the image index determination unit 114 may use the distance from the photographing device 2 to the characteristic object as the image index. For example, when the characteristic object is a mascot character, the image processing device 20 may determine the distance from the photographing device 2 to the mascot character in the same manner as the determination of the distance of the object 90. The image index determination unit 114 may increase the degree of the image index as the distance from the photographing device 2 to the mascot character is closer to a predetermined distance suitable for photographing.

The object status index is not limited to that illustrated in FIG. 6. The object status index may be a part of FIG. 6 or may include other object status indexes. For example, the status index determination unit 124 may use the position information of the object 90 as the object status index. Specifically, the sensor 4, which is a position sensor having a GPS (Global Positioning System) function or the like, detects position information of the object 90. The status index determination unit 124 may increase the degree of the object status index as the position of the object 90 is closer to the photographing device 2.

The status index determination unit 124 may use the blood pressure of the object 90 as the object status index. Specifically, the sensor 4, which is a sphygmomanometer, detects the blood pressure of the object 90. The status index determination unit 124 may increase the degree of the object status index as the difference between the detected blood pressure and the average value of the blood pressure of the object 90 larges. When the electroencephalogram of the object 90 can be detected using the electroencephalogram sensor, the status index determination unit 124 may use the electroencephalogram of the object 90 as the object status index.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Although the invention made by the inventor has been specifically described based on the embodiment, the present invention is not limited to the embodiment already described, and it is needless to say that various modifications can be made without departing from the gist thereof.

What is claimed is:

1. A photographing control device comprising:
    an analysis result acquisition unit configured to acquire an analysis result of an image obtained by photographing an object by a photographing device;
    a status acquisition unit configured to acquire a detection result obtained by detecting a status of the object by a sensor;
    an index determination unit configured to determine a degree of index for each of indexes related to the object based on the analysis result of the image and the detection result of the status of the object;
    an evaluation value calculation unit configured to calculate an evaluation value for evaluating a stored value of the image using the degree of index for each of the indexes related to the object;
    an image storage control unit configured to control to store the image when the evaluation value exceeds a predetermined first threshold value; and
    a photographing device control unit configured to control the photographing device to photograph the object so that the object covers a predetermined percentage of the image when the evaluation value exceeds a predetermined first threshold value.

2. The photographing control device according to claim 1, wherein the evaluation value calculation unit calculates the evaluation value based on the degree of index and a weight coefficient for each index.

3. The photographing control device according to claim 1, wherein the image storage control unit controls not to store the image when the evaluation value is not more than a predetermined second threshold value.

4. The photographing control device according to claim 3, wherein the predetermined second threshold value is different from the predetermined first threshold value.

5. The photographing control device according to claim 1 wherein the photographing device control unit is configured to control the photographing device to photograph the object so that the object appears in a predetermined area of the image when the evaluation value exceeds the predetermined first threshold value.

6. The photographing control device according to claim 5, wherein a plurality of objects to be photographed exist, wherein the index determination unit determines the degree of index for each of the plurality of objects,
wherein the evaluation value calculation unit the evaluation value for each of the plurality of objects, and
wherein the photographing device control unit controls the photographing device to track and photograph one of the plurality of objects having a largest evaluation value among the evaluation values of the plurality of the objects.

7. The photographing control device according to claim 1, further comprising:
an effect improvement determination unit configured to determine whether it is necessary to improve an effect of a characteristic object which is operable, based on the degree of index, when the image is not stored; and
an improvement instruction unit configured to instruct to improve the effect when it is determined that it is necessary to improve the effect of the characteristic object.

8. The photographing control device according to claim 1, wherein the photographing device control unit configured to control the photographing device to track and photograph the object when the evaluation value exceeds the predetermined first threshold value.

9. A photographing control system comprising:
at least one photographing device photographing at least one object;
at least one sensor detecting a status of the at least one object; and
a photographing control device controlling regarding photographing by the at least one photographing device,
wherein the photographing control device includes:
an analysis result acquisition unit configured to acquire an analysis result of an image obtained by photographing the at least one object by the at least one photographing device;
a status acquisition unit configured to acquire a detection result obtained by detecting a status of the at least one object by the at least one sensor;
an index determination unit configured to determine a degree of index for each of indexes related to the at least one object based on the analysis result of the image and the detection result of the status of the at least one;
an evaluation value calculation unit configured to calculate an evaluation value for evaluating a stored value of the image using the degree of index for each of the indexes related to the at least one object;
an image storage control unit configured to control to store the image when the evaluation value exceeds a predetermined first threshold value; and
a photographing device control unit configured to control the at least one photographing device to photograph the at least one object so that the at least one object covers a predetermined percentage of the image when the evaluation value exceeds a predetermined first threshold value.

10. The photographing control system according to claim 9, wherein the evaluation value calculation unit calculates the evaluation value based on the degree of index and a weight coefficient for each index.

11. The photographing control system according to claim 9, wherein the image storage control unit controls not to store the image when the evaluation value is not more than a predetermined second threshold value.

12. The photographing control system according to claim 9,
wherein the photographing device control unit is configured to control the photographing device to photograph the at least one object so that the at least one object appears in a predetermined area of the image.

13. The photographing control system according to claim 12,
wherein the at least one object comprises a plurality of objects,
wherein the index determination unit determines the degree of index for each of the plurality of objects,
wherein the evaluation value calculation unit the evaluation value for each of the plurality of objects, and
wherein the photographing device control unit controls the photographing device to track and photograph one of the plurality of objects having a largest evaluation value among the evaluation values of the plurality of the objects.

14. The photographing control system according to claim 9, further comprising:
an effect improvement determination unit configured to determine whether it is necessary to improve an effect of a characteristic object which is operable, based on the degree of index, when the image is not stored; and
an improvement instruction unit configured to instruct to improve the effect when it is determined that it is necessary to improve the effect of the characteristic object.

15. A photographing control method comprising:
acquiring an analysis result of an image obtained by photographing an object by using a photographing device;
acquiring a detection result obtained by detecting a status of the object by using a sensor;
determining degree of index for each of indexes related to the object based on the analysis result of the image and the detection result of the status of the object;
calculating an evaluation value for evaluating a stored value of the image using the degree of index for each of the indexes related to the object;
controlling to store the image when the evaluation value exceeds a predetermined first threshold value; and
controlling the photographing device to photograph the object so that the object covers a predetermined percentage of the image when the evaluation value exceeds a predetermined first threshold value.

16. The photographing control method according to claim 15, wherein the evaluation value is calculated based on the degree of index and a weight coefficient for each index.

17. The photographing control method according to claim 15, wherein in the controlling, the image is not stored when the evaluation value is not more than a predetermined second threshold value.

18. The photographing control method according to claim 15, further comprising:
controlling the photographing device to photograph the object so that the object appears in a predetermined area of the image when the evaluation value exceeds the predetermined first threshold value.

19. The photographing control method according to claim 18,
wherein a plurality of objects to be photographed exist,
wherein in the determining, the degree of index for each of the plurality of objects is determined,
wherein in the calculating, the evaluation value for each of the plurality of objects is calculated, and
wherein in the controlling the photographing device, the photographing device is controlled to track and photograph one of the plurality of objects having a largest evaluation value among the evaluation values of the plurality of the objects.

20. The photographing control method according to claim 15, further comprising:
determining whether it is necessary to improve an effect of a characteristic object which is operable, based on the degree of index, when the image is not stored; and
instructing to improve the effect when it is determined that it is necessary to improve the effect of the characteristic object.

* * * * *